US008756113B2

(12) United States Patent
Willoughby

(10) Patent No.: US 8,756,113 B2
(45) Date of Patent: Jun. 17, 2014

(54) METHODS FOR AUTOMATED ACCESS TO SHIPPING SERVICES

(75) Inventor: Stuart Willoughby, Oakton, VA (US)

(73) Assignee: United States Postal Service, Washington, DC (US)

( * ) Notice: Subject to any disclaimer, the term of this patent is extended or adjusted under 35 U.S.C. 154(b) by 360 days.

(21) Appl. No.: 13/334,485

(22) Filed: Dec. 22, 2011

(65) Prior Publication Data
US 2012/0179575 A1 Jul. 12, 2012

Related U.S. Application Data

(63) Continuation of application No. 10/362,630, filed as application No. PCT/US01/27535 on Sep. 6, 2001, now Pat. No. 8,108,223.

(60) Provisional application No. 60/230,871, filed on Sep. 7, 2000.

(51) Int. Cl.
G06Q 50/28 (2012.01)
(52) U.S. Cl.
USPC ............ 705/26.41; 705/1; 705/330; 705/333; 705/14.51; 705/406; 713/189
(58) Field of Classification Search
USPC ......... 705/26.41, 1, 27, 330, 333, 14.51, 406, 705/407
See application file for complete search history.

(56) References Cited

U.S. PATENT DOCUMENTS

| 5,341,505 | A | 8/1994 | Whitehouse |
| 6,047,273 | A | 4/2000 | Vaghi |
| 6,061,667 | A | 5/2000 | Danford-Klein et al. |
| 6,064,981 | A | 5/2000 | Barni et al. |
| 6,078,889 | A | 6/2000 | Boucher et al. |
| 6,220,509 | B1 | 4/2001 | Byford |
| 6,233,568 | B1 | 5/2001 | Kara |
| 6,249,777 | B1 | 6/2001 | Kara et al. |
| 6,383,593 | B1 | 5/2002 | Fabel |
| 8,291,239 | B2 * | 10/2012 | Pintsov ......................... 713/189 |
| 2002/0013743 | A1 | 1/2002 | Shoffner |
| 2002/0032613 | A1 | 3/2002 | Buettgenbach et al. |
| 2002/0072974 | A1 | 6/2002 | Pugliese et al. |
| 2007/0250390 | A1 * | 10/2007 | Lee et al. ......................... 705/14 |

* cited by examiner

Primary Examiner — Vanel Frenel
(74) Attorney, Agent, or Firm — Finnegan, Henderson, Farabow, Garrett & Dunner LLP

(57) ABSTRACT

Systems and methods are disclosed for obtaining shipping services information over a network by a telephone call center receiving orders for merchandise. Instructions are received at the telephone call center, which permits the telephone call center to access the shipping information for shipment of the merchandise. The telephone call center sends the request over the network to the server for the shipping services information. Thereafter, the server sends the requested shipping services information to the telephone call center. The shipping service information may be in the format of a label, which may be attached to a package for shipment of the merchandise.

20 Claims, 23 Drawing Sheets

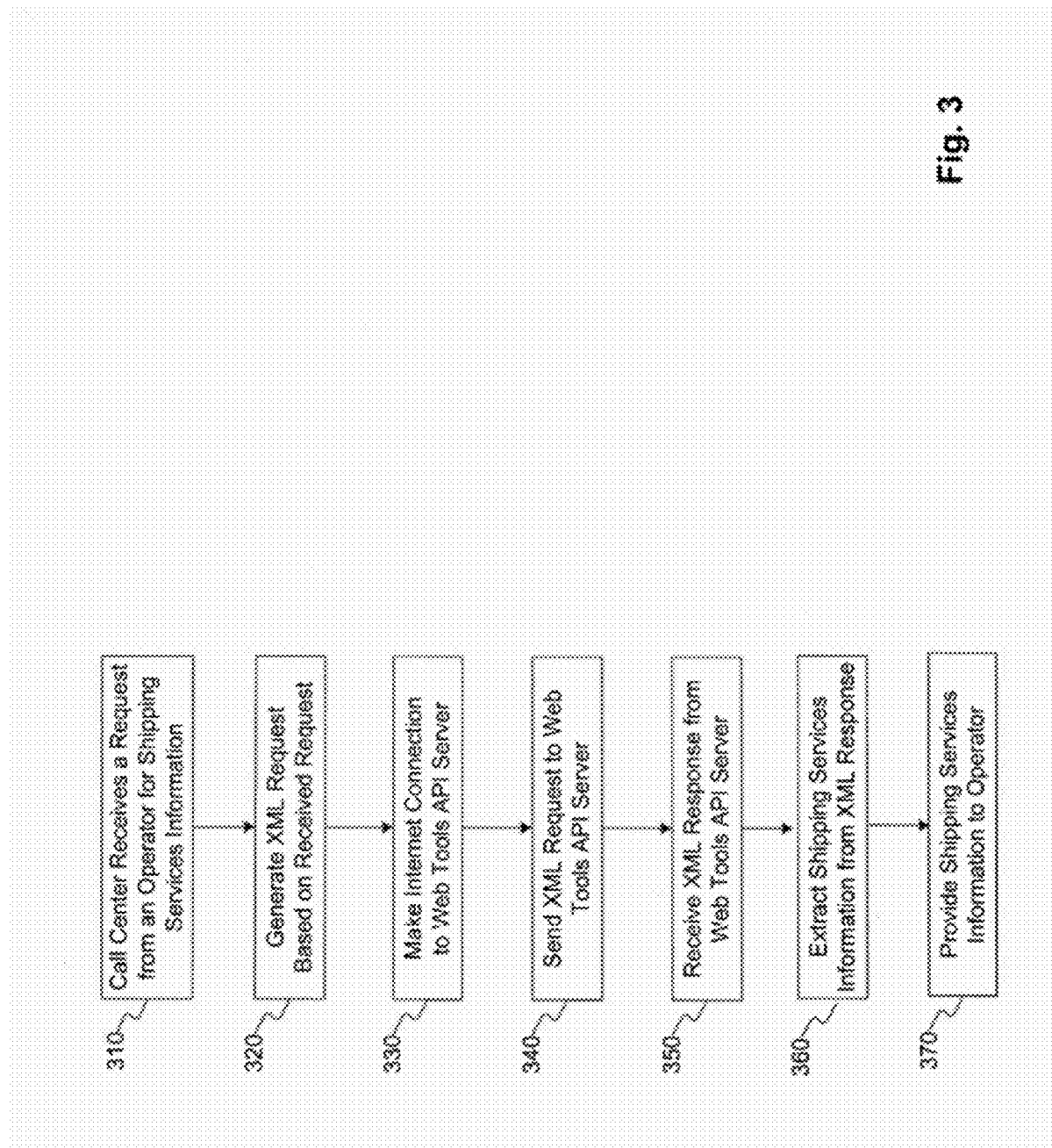

Shipping Assistant Processing Information

| Field | Value |
|---|---|
| Http Address | production.shippingaps.com ⌐410 |
| Http Port | 80 |
| Proxy Server | 56.5.0.200 |
| Proxy Port | 8080 ⌐420 |
| Username | 465USPS06615 |
| API Password | 139XX36HF309 |
| Output Path | C:\PROGRAM FILES\SHIPPINGASST V1.2\Out |
| Default Printer | HP LaserJet 5L (PCL) |
| Company Name | XYZ Corporation |
| Company E-mail | XYZ@etailer.com |

[Continue] ⌐455

Sender address used in e-mail messages (Merchandise Return and Delivery Confirmation tabs only). ⌐460

METHODS FOR AUTOMATED ACCESS TO SHIPPING SERVICES

CROSS REFERENCE TO RELATED APPLICATION

This application is a continuation of U.S. application Ser. No. 10/362,630, filed Feb. 17, 2004, U.S. Pat. No. 8,108,223 which is a National Stage Entry of PCT/US01/27535, filed Sep. 6, 2001, and claims priority from U.S. Provisional Application Ser. No. 60/230,871, filed Sep. 7, 2000, by Stuart Willoughby and titled METHOD FOR AUTOMATED ACCESS TO SHIPPING SERVICES, all of which are incorporated herein by reference. This application is related to U.S. Provisional Application Ser No. 60/227,903, filed Aug. 25, 2000, by Stuart Willoughby and titled SYSTEMS AND METHODS FOR APPLICATION PROGRAMMING INTERFACES FOR SHIPPING SERVICES, and Copending U.S. patent application Ser. No. 10/344,992, filed Aug. 27, 2001, by Stuart Willoughby and titled SYSTEMS AND METHODS FOR APPLICATION PROGRAMMING INTERFACES FOR SHIPPING SERVICES, the entire disclosure of each is expressly incorporated herein by reference.

DESCRIPTION OF THE INVENTION

1. Field of the Invention

This invention relates to obtaining shipping services information over a network by a telephone call center using application programming interfaces ("API's" or "Web Tools API") supplied by the United States Postal Service ("USPS"). A telephone call center receives orders for merchandise. The telephone call center requests shipping services information from a server for the shipment of the merchandise. The telephone call center receives the requested shipping services information from the server, and provides the shipping services information to an operator. The shipping services information may be provided to the operator in the format of a label. The telephone call center may include a facility for printing the label. The label may be attached to the packaged merchandise for shipment.

2. Background of the Invention

In the aforementioned U.S. Provisional Application Ser. No. 60/227,903 and copending U.S. patent application Ser. No. 10/344,992, methods are disclosed for providing an Internet customer with information relative to shipping services using application programming interfaces ("API's") supplied by the United States Postal Service ("USPS"). The API's are designed to provide access to USPS shipping data and information over a network. The network is preferably the Internet; however, any type of network known to those skilled in the art may be used.

The shipping services information to be transferred over the network may include postal rates, international and domestic service standards, addressing information, shipping labels, merchandise return labels, delivery confirmation labels, courtesy reply labels, etc. All of this useful shipping information resides on one or more USPS servers.

Mail order retailers that use a telephone call center from which operators access a marketing database server while taking telephone orders from a customer have a need for the information provided by the above described API's but may not have the time for programming resources to integrate them into their existing systems.

It is accordingly an object of an embodiment of the invention to provide access to USPS shipping information to telephone call centers, such as mail order retailers that use a telephone call center to take telephone orders from customers.

This is achieved by providing, to telephone call centers, software that is integrated with the API's. For convenience the software will be referred to as "the shipping assistant." The shipping assistant may be installed on a computer for use by a telephone operator for accessing servers having USPS shipping information. The servers may include, for example, one or more USPS servers. The shipping assistant may be written in any programming language or tool known to those skilled in the art, for example, C, C++, visual basic, HyperText Markup Language ("HTML"), Extensible Markup Language ("XML"), etc.

SUMMARY OF THE INVENTION

In accordance with an embodiment of the invention, systems and methods are disclosed for obtaining shipping services information over a network by a telephone call center receiving orders for merchandise. Instructions are received at the telephone call center, which permits the telephone call center to access the shipping services information residing on a server. The telephone call center generates a request for the shipping services information on the server for shipment of the merchandise. The telephone call center sends the request for the shipping services information to the server. Thereafter, the telephone call center receives the requested shipping services information from the server. The telephone call center provides the shipping services information to an operator at the telephone call center.

In accordance with another embodiment of the invention, systems and methods are disclosed for obtaining shipping services information over a network by a mail center, wherein the shipping services information is in the format of a label and includes postage thereon. Instructions are received at the mail center for accessing the shipping services information residing on a server; the mail center generates a request at the mail center for the shipping services information; sends the request for the shipping services information to the server over the network; receives at the mail center the requested shipping services information from the server over the network; and provides the shipping services information by the mail center to a customer.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 3 is a flowchart showing a method for obtaining shipping services information over a network.

FIG. 4 is a diagram of a user interface for logging into the shipping assistant;

FIGS. 5-21 illustrate a series of user interfaces to which a telephone call center operator employed by a telephone retail outlet may access while taking an order from a customer using the method of the present invention. In particular, FIG. 5 is a diagram of a user interface for accessing tracking and/or shipping confirmation information;

FIG. 6 is a diagram of a completed user interface for accessing tracking and/or shipping confirmation information;

FIG. 7 is a diagram of a user interface for accessing address checking information;

FIG. 8 is a diagram of a user interface for accessing domestic rates information;

FIG. 9 is a diagram of a user interface for a domestic rates restriction list;

FIG. 10 is a diagram of a user interface for accessing international rates information;

FIG. 11 is a diagram of a user interface for international rates, the user interface having a conditions of mailing list;

FIG. 12 is a diagram of a user interface for accessing service standards information;

FIG. 13 is a diagram of a service standards user interface showing a service standards response.

FIG. 14 is a diagram of a user interface for accessing shipping label information;

FIG. 15 is a diagram of a user interface for e-mailing a delivery confirmation number to a sender and recipient of a mail item;

FIG. 16 is a diagram of a user interface for accessing delivery confirmation information;

FIG. 17 is a diagram of a user interface for accessing merchandise return information;

FIG. 18 is a diagram of a user interface for e-mailing a merchandise return label to a sender of a mail item;

FIG. 19 is a diagram of a user interface for displaying a merchandise return label;

FIG. 20 is a diagram of a user interface for accessing courtesy reply information; and FIG. 21 is a diagram of a user interface for displaying a courtesy reply label.

DESCRIPTION OF THE EMBODIMENTS

Reference will now be made in detail to the exemplary embodiments of the invention, an example of which is illustrated in the accompanying drawings. Wherever possible, the same reference numbers will be used throughout the drawings to refer to the same or like parts.

Figure 1:
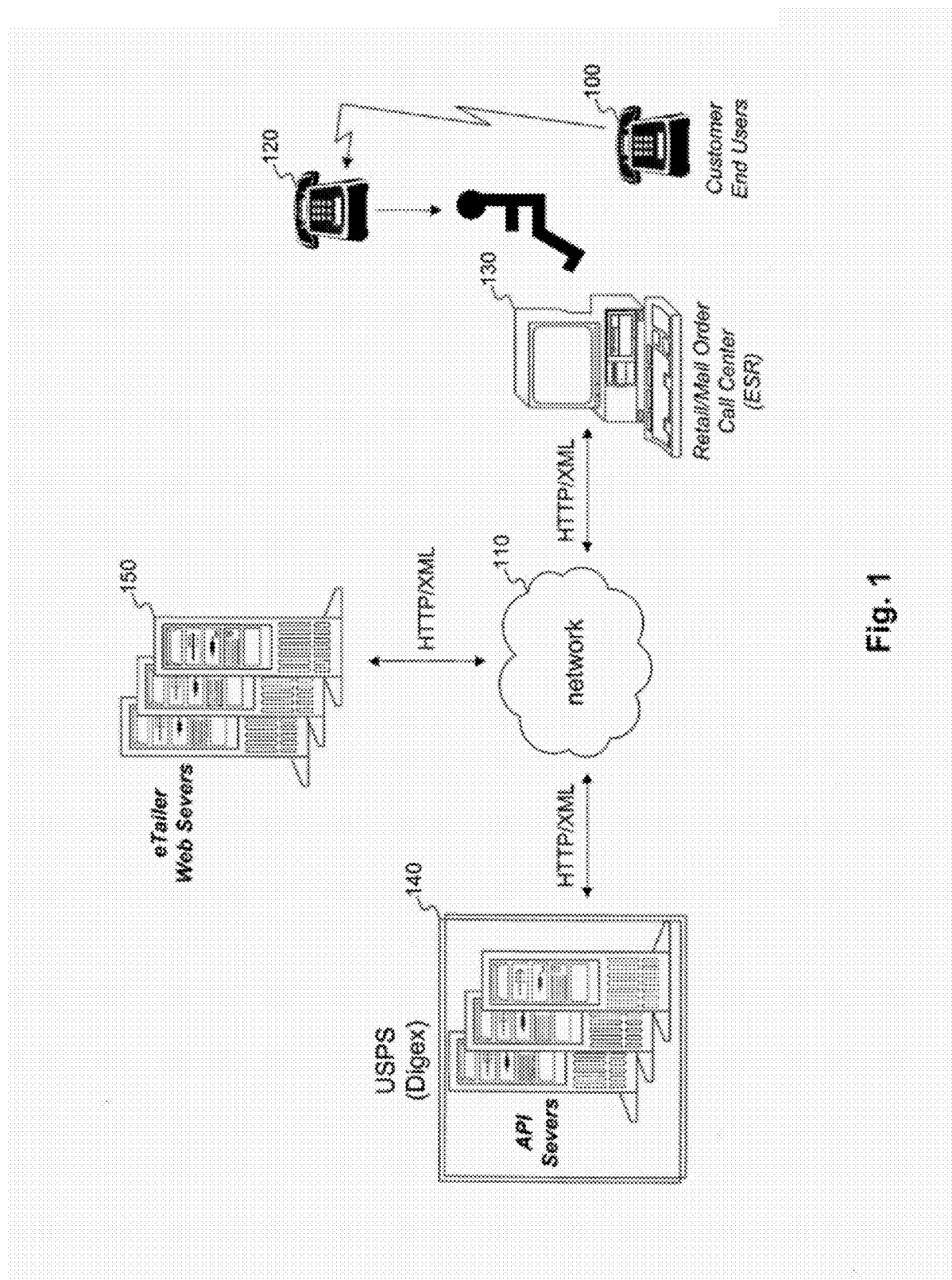
FIG. 1 is a schematic illustration of a system incorporating an embodiment of the invention through a telephone call system.

In accordance with the present invention, and as shown in FIG. 1, a retail/mail order telephone call center is represented by a mail order system 130 attended by an operator 120 accessible by a customer 100 via a telephone. Although only one call center system 130 is shown, it is intended as representative of a plurality of such systems, each with an operator 120 who has access to customers 100 by telephone. Each such call center system 130 is loaded with shipping assistant software supplied on an external storage medium, such as a compact disc ("CD"), floppy disk, etc.

The CD includes software and data, which allows call center system 130 to access the various services provided by the USPS over a network 110, including access to the shipping services information residing on one or more servers 140, such as the USPS Web Tools API server ("Web Tools API server"). USPS Web Tools API server 140 is described in detail in the aforementioned U.S. Provisional Application Ser. No. 60/227,903 and copending U.S. patent application Ser. No. 10/344,992. The CD also may include initialization routines, which install the shipping assistant software and data with a minimal amount of operator 120 interaction. Thus, the entire contents of the CD provides the ability for a call center system 130 to access the USPS shipping services information without having to write custom software.

Call center system 130 is connected to Web Tools API server 140 via network 110, so that shipping services information corresponding to the user interfaces shown in FIGS. 5-21 of the drawings is instantly available to an operator 120. Network 110 may include, for example, a Local Area Network (LAN), a Wide Area Network (WAN), a wireless network, the Internet, an intranet, and/or any other network or communication medium known to one of ordinary skill in the relevant art. Communications between call center system 130 and Web Tools API server 140 or e-commerce server 150 may take place over network 110 through a secure sockets layer ("SSL") protocol or secure HyperText Transfer Protocol ("S-HTTP").

Operator 120 may provide the shipping services information to an electronic commerce ("e-commerce") entity at an e-commerce server 150. E-commerce entities may include, for example, multi-carriers, electronic retailers, electronic shopping malls, auction houses, or third party vendors that buy in broker services over a network.

Figure 2:
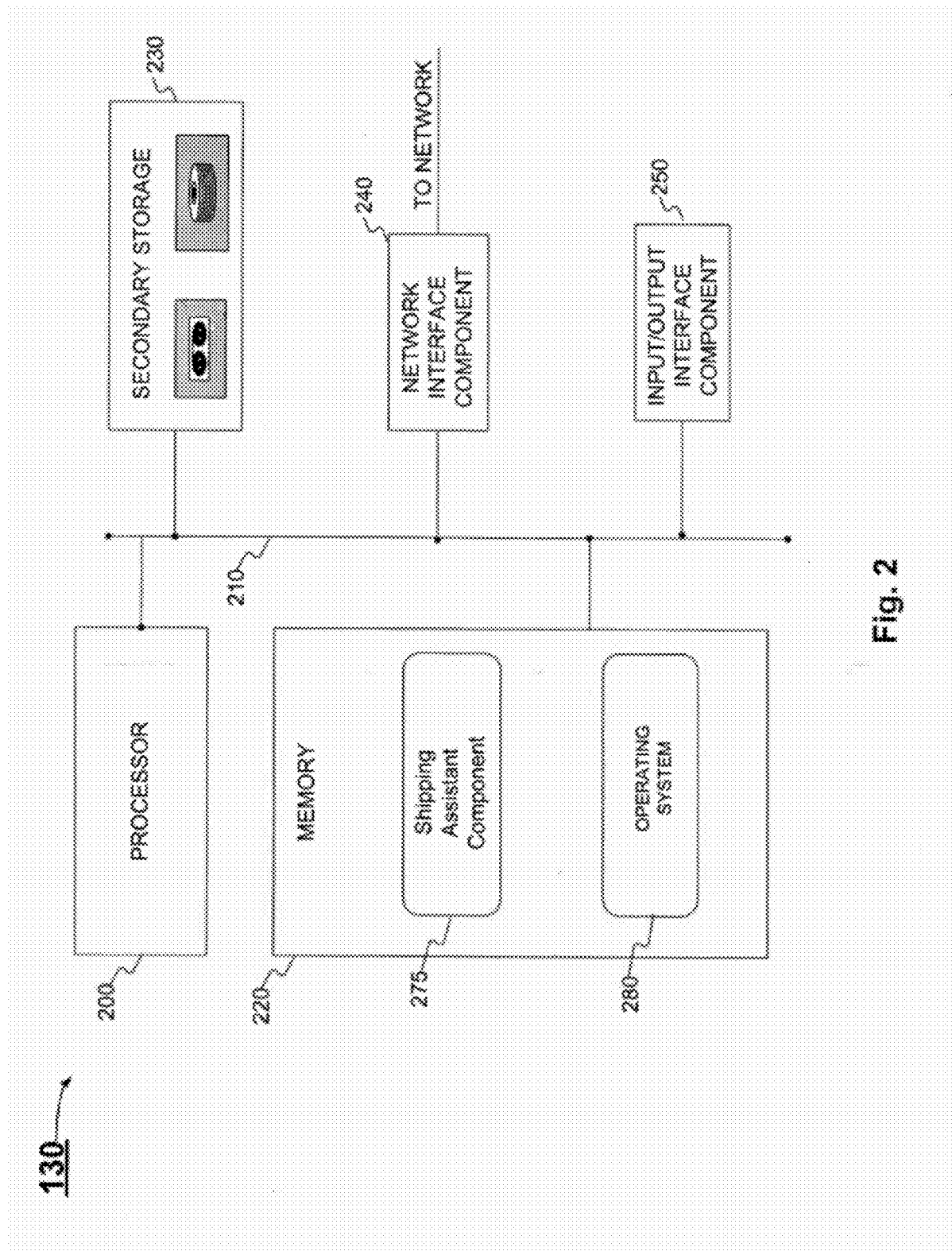
FIG. 2 is a block diagram of a call center system consistent with the present invention.

FIG. 2 is a block diagram of a call center system 130 consistent with the present invention. Call center system 130 may include a processor 200, which connects over bus 210 to a memory 220, a secondary storage 230, a network interface component 240, and an input/output interface component 250. Memory 220 may include a shipping assistant component 275 and an operating system 280.

Operation of call center system 130 is generally controlled and coordinated by operating system 280. Operating system 280 controls allocation of system resources and performs tasks, such as memory management, process scheduling, networking, and services, among other things.

Secondary storage 230 may include a computer-readable medium, such as a hard disk drive, a compact disc ("CD") drive, or a read/write CD drive. From the CD drive or the read/write CD drive, software and data may be loaded onto the disk drive, which may then be copied into memory 220. Similarly, software and data in memory 220 may be copied onto the hard disk drive, which may then be loaded onto a read/write CD drive.

Network interface component 240 may include hardware and software for sending and receiving data over network 110. Input/Output interface component 250 may include one or more of, for example, a keyboard, a pointing device, a keypad, a display unit, or a printing device.

FIG. 3 is a flowchart showing a method for obtaining shipping services information over a network. An operator 120 receives an order for merchandise from a customer 100. Operator 120 may access a call center system 130 to log into a shipping assistant component 275. Once operator 120 is logged into shipping assistant component 275, she may send to shipping assistant component 275 a request for shipping services information relative to shipment of the merchandise order. As shown in FIG. 3, shipping assistant component 275 receives the request from operator 120 for the shipping services information (stage 310).

Shipping assistant component 275 generates a XML request for the shipping services information (stage 320). Shipping assistant component 275 may make a network connection to Web Tools API Server 140 (stage 330). Next, shipping assistant component 275 sends the XML request to Web Tools API server 140 through network 110 (stage 340). Web Tools API server 140 receives the XML request, generates a XML response to the request, and sends the XML response over the network to call center system 130. The XML response includes the requested shipping services information.

Preferably the requests and responses are implemented in Extensible Markup Language ("XML"); however, they are not limited to language and could be written in any programming language known to those skilled in the art. The format of the XML requests and responses are described in detail in the aforementioned U.S. Provisional Application Ser. No. 60/227,903 and copending U.S. patent application Ser. No. 10/344,992.

Shipping assistant component 275 receives the XML response (stage 350). Thereafter, shipping assistant component 275 extracts the shipping services information from the XML response (stage 360). Thereafter, shipping assistant component 275 may provide the shipping services information to operator 120 by, for example, displaying the shipping services information to operator 120 through a browser or user interface (stage 370).

The shipping services information may be in the format, for example, of a label. The label may be printed on a printer and applied to a package. Thereafter, the package may be placed into a mail stream for delivery to the recipient specified in the label. The mail stream may include, for example, the mail stream provided by the USPS.

Operator 120 may provide the shipping services information to the customer 100. Alternatively, operator 120 may provide the shipping services information to an e-commerce entity at an e-commerce server 150.

FIG. 4 is a diagram of a user interface for logging into the shipping assistant. An operator 120 may access a call center system 130 to log into a shipping assistant component 275. Shipping assistant component 275 may retrieve network information that was supplied during installation of the shipping assistant component 275 on call center system 103 for connecting to a Web Tools API server 140. Shipping assistant component 275 may display the network information in a log-in user interface 400 shown in FIG. 4. The network information may be displayed in fields http address 405, http port 410, proxy server 415, and proxy port 420. In addition, shipping assistant component 275 may retrieve operator information that was supplied during installation of the shipping assistant component 275 on call center system 130 for connecting to Web Tools API server 140. Shipping assistant component 275 may display the operator information in fields username 425, output path 435, default printer 440, company name 445, and company e-mail 450. Operator 120 may supply an API password 430. Alternatively, operator 120 may supply information for any of the fields.

Thereafter, operator 120 clicks the continue button 455 to log into shipping assistant component 275. Shipping assistant component 275 retrieves the information from the user interface and verifies whether operator 120 is allowed to access the shipping services information based on the retrieved information. If the operator 120 is not allowed to access the shipping services information (i.e., not a valid user), shipping assistant component 275 sends a message to operator 120 indicating the error condition. Otherwise, shipping assistant component 275 may display to operator 120 one or more of the user interfaces shown in FIGS. 5-19.

Figure 5:
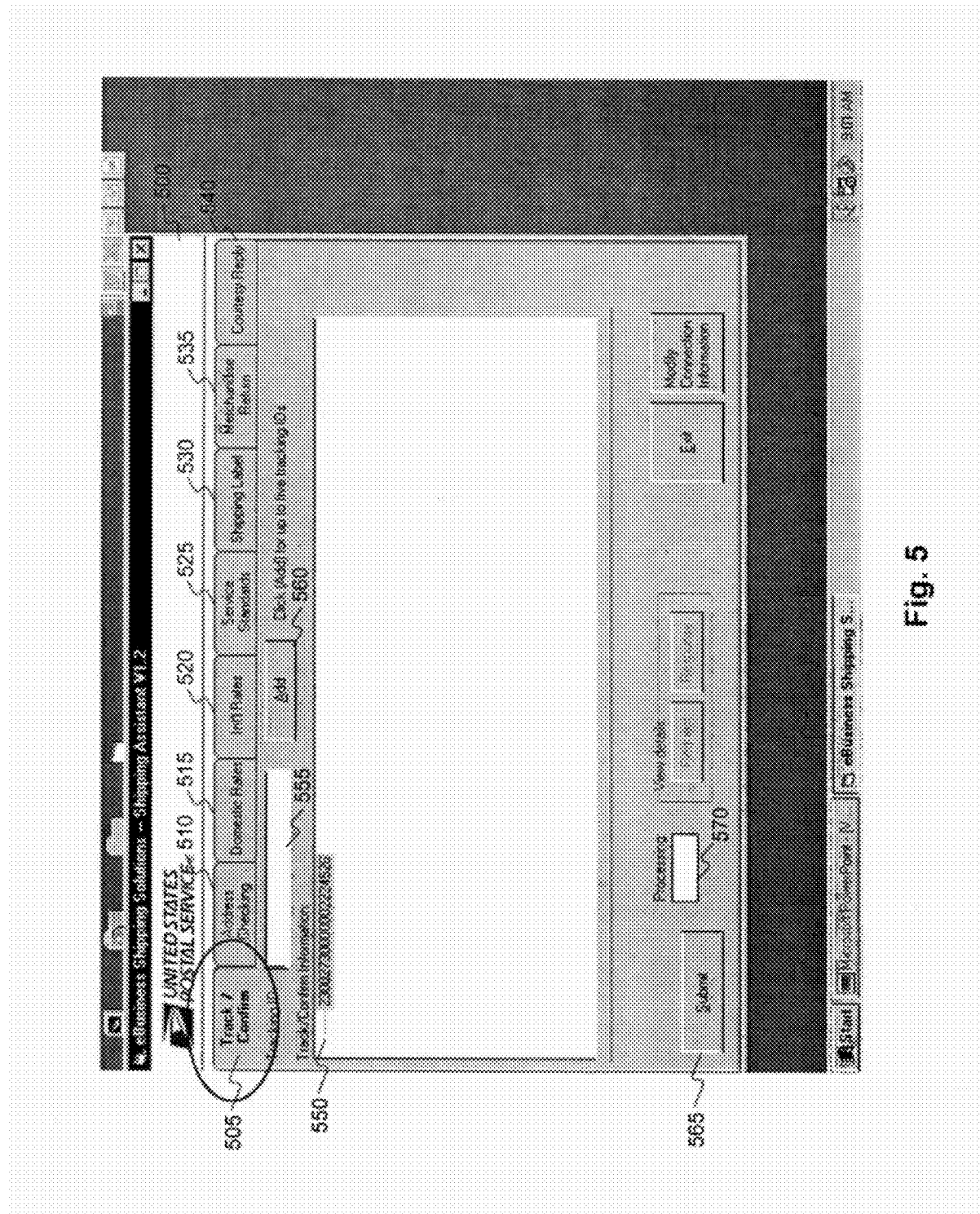
Figure 6:
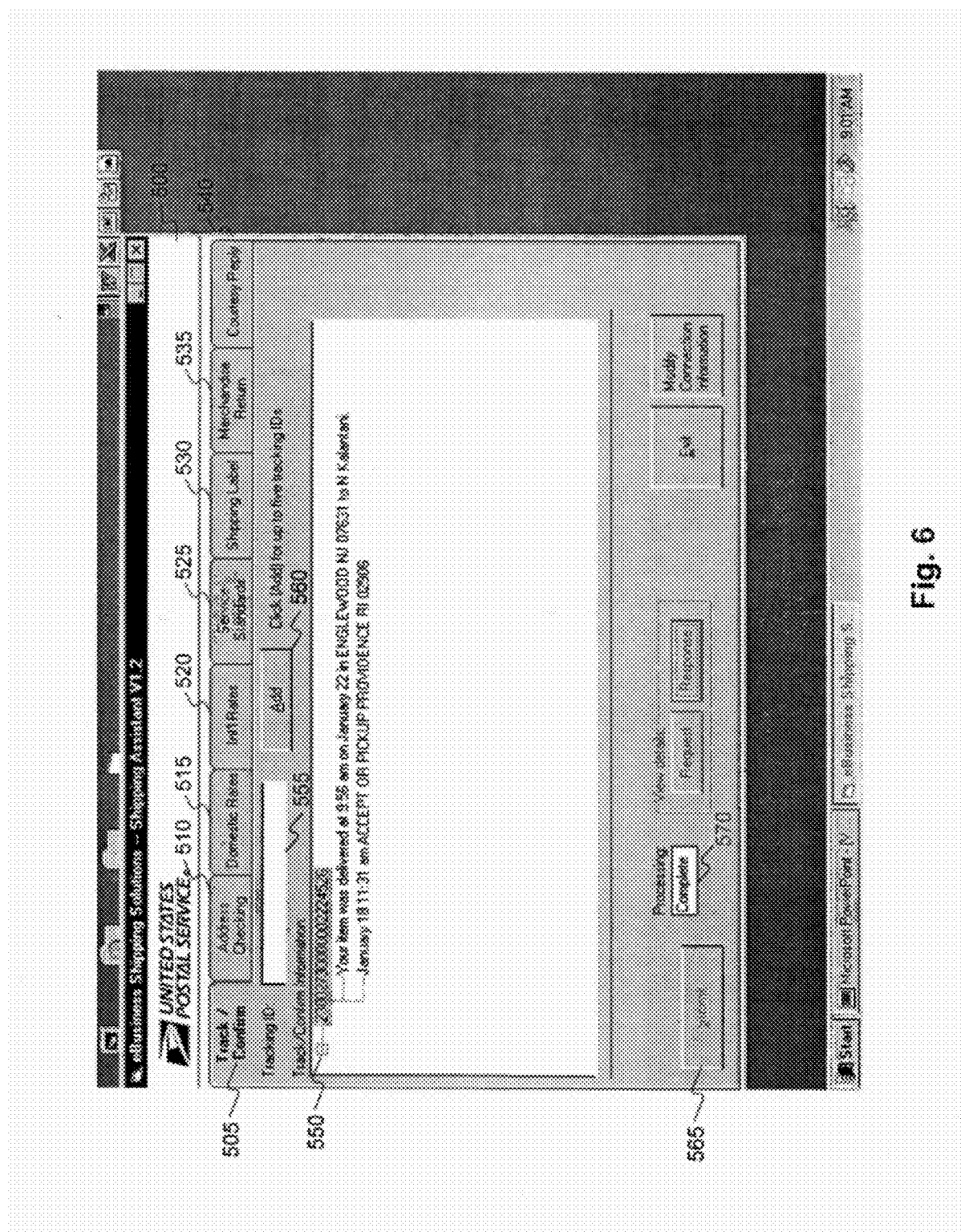

FIG. 5 is a diagram of a user interface for accessing tracking and/or shipping confirmation information. An operator 120 may receive a telephone call from a customer 100 requesting tracking information about a merchandise order that has been placed in a mail stream. As shown in FIG. 5, operator 120 may access a track/confirm user interface 500 by clicking tab 505. Customer 100 supplies to operator 120 a tracking id that is associated with the merchandise order. Operator 120 may input the tracking id into a tracking id field 555 and click an add button 560 to add the tracking id to a list of tracking id's for which status information is requested. Operator 120 may then click a submit button 565. Shipping assistant component 275 may display a status of processing of the request in a processing field 570. Thereafter shipping assistant component 275 generates a XML request for the tracking information for the given tracking id's and sends the XML request to a Web Tools API server 140 through network 110. Web Tools API server 140 retrieves the requested information and sends it in a XML response to shipping assistant component 275 at call center system 130. Shipping assistant component 275 may display the tracking information to operator 120 in a response track/confirm information field 550 as shown in FIG. 6. Operator 120 may provide the information to customer 100.

Figure 7:
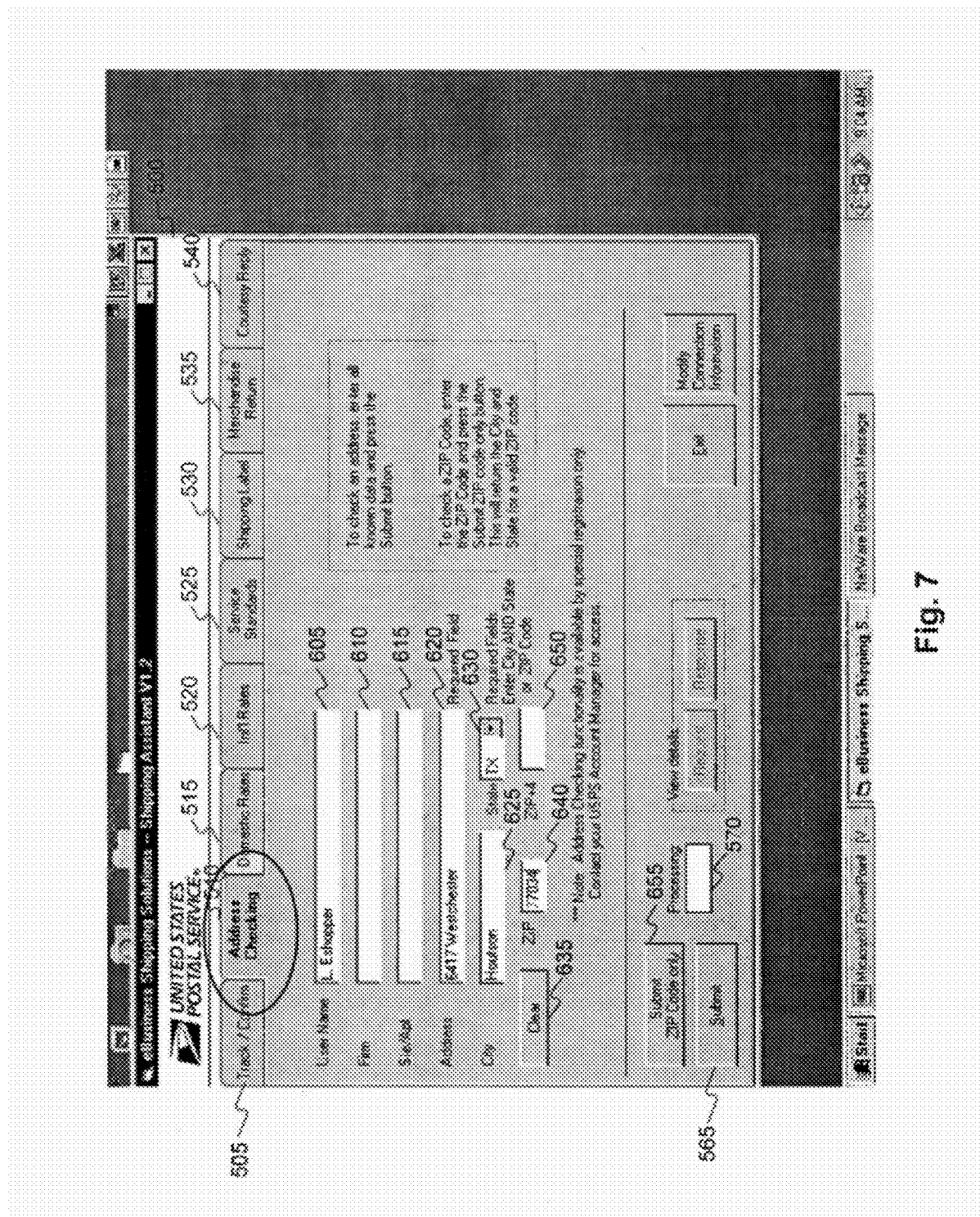

FIG. 7 is a diagram of a user interface for accessing address checking information. An operator 120 may receive a telephone call from a customer 100 for a purchase of merchandise that is to be mailed to a recipient, but customer 100 only knows partial information about the recipient's address. For example, customer 100 does not know the recipient's ZIP code.

Operator 120 may access an address checking user interface 500 by clicking tab 510. Customer 100 may provide to operator 120 a city and state of the recipients address. As shown in FIG. 7, operator 120 may input into user interface 500 the city 625 and state 630 of the recipient's address. Operator 120 may then click a submit button 565. Thereafter shipping assistant component 275 generates a XML request for the ZIP code information and sends the XML request to a Web Tools API server 140 through network 110. Web Tools API server 140 retrieves the requested information and sends it in a XML response to shipping assistant component 275 at call center system 130. Shipping assistant component 275 may display the five digit ZIP code in the ZIP code field 640 and the four digit ZIP+4 code in the ZIP+4 field 650. Then operator 120 may provide the ZIP code information to the customer 100.

In an alternate example, operator 120 receives a request from a customer 100 to verify a recipient's address for a merchandise order, the request includes the recipients name and address. Operator 120 accesses an address checking user interface 500 by clicking tab 510. As shown in FIG. 7, the operator 120 may input into user interface 500 the recipient's name 605, address 620, city 625, state 630, and ZIP code 640 information. Operator 120 then clicks the submit button 565. Thereafter shipping assistant component 275 generates a XML request based on the information from user interface 500. Next, shipping assistant component 275 sends the XML request to a Web Tools API server 140 through network 110. Web Tools API server 140 determines whether the address information is valid and sends a XML response to the shipping assistant component 275 at call center system 130. Shipping assistant component 275 creates a response, based on the XML response, indicating whether the address is valid. Then, shipping assistant component 275 displays the response to operator 120. Operator 120 may provide the response to customer 100.

Figure 8:
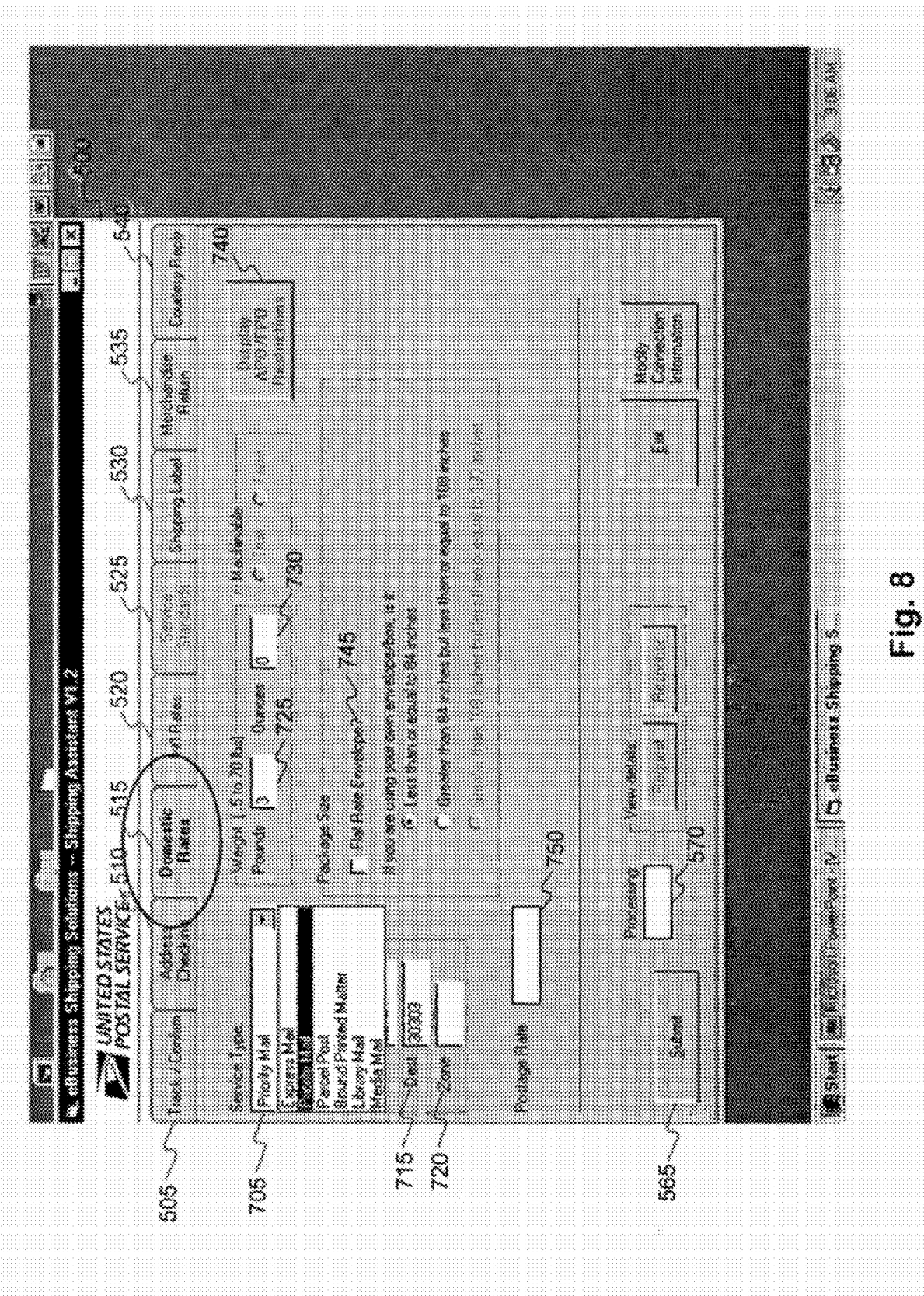

FIG. 8 is a diagram of a user interface for accessing domestic rates information. An operator 120 may receive a telephone call from a customer 100 for a purchase of merchandise that is to be mailed to a recipient within the United States. Operator 120 may use information provided by customer 100 to request a domestic rate for shipping the merchandise to the recipient. As shown in FIG. 8, operator 120 may access a domestic rates user interface 500 by clicking tab 515. Operator 120 may input information relevant to shipping the packaged merchandise, such as a shipping service type 705, which specifies the type of delivery service to use in shipping the packaged merchandise. In addition, operator 120 may input the weight of the packaged merchandise in pounds 725 and ounces 730, information about the ZIP code of the sender 710 and recipient 715, and zone 720. Operator 120 may also input information about the size of the packaged merchandise 745, and may then click a submit button 565.

Figure 9:
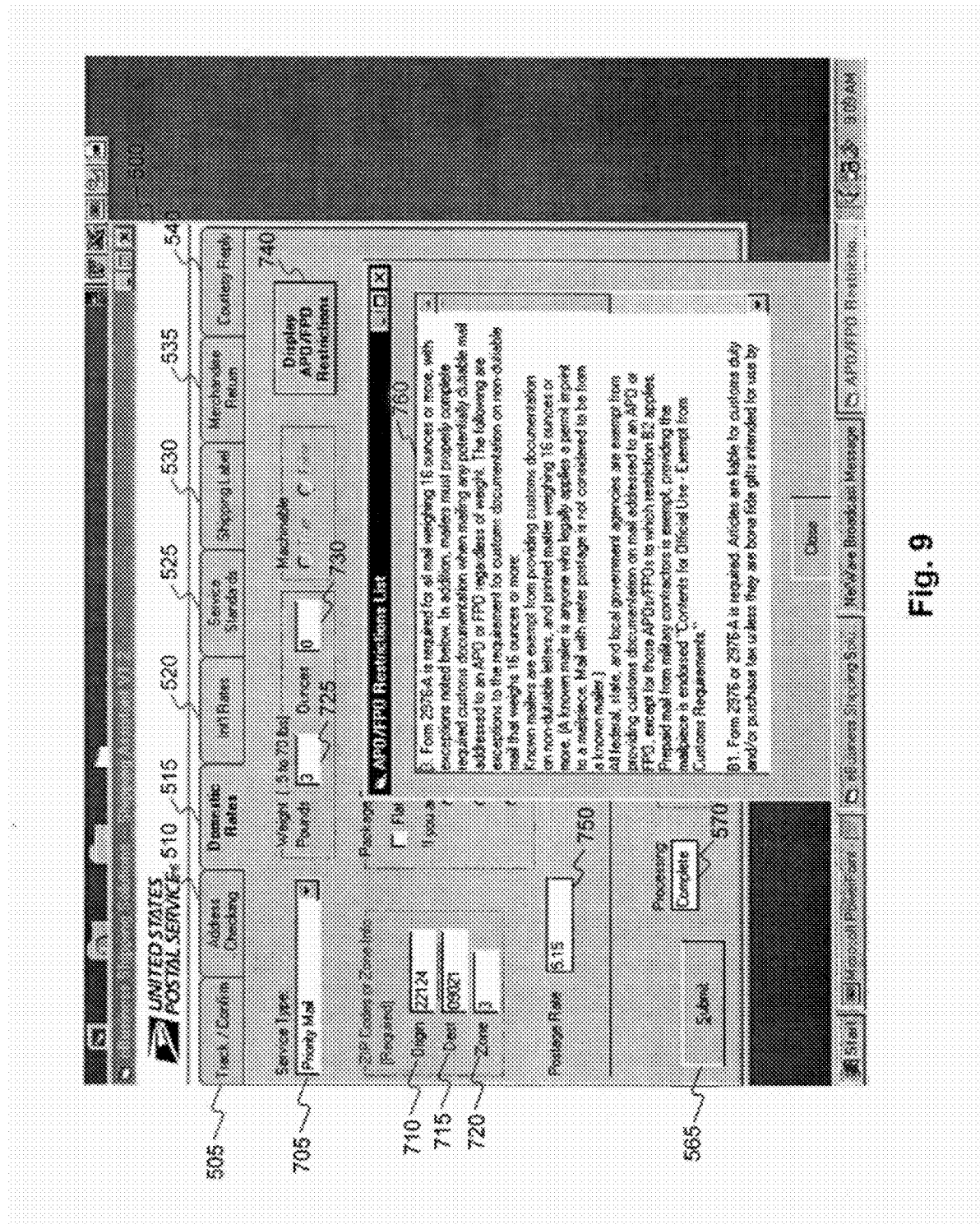

Thereafter, shipping assistant component 275 generates a XML request for the domestic rate information and sends the XML request to Web Tools API server 140 through network 110. Web Tools API server 140 retrieves the requested information and sends it in a XML response to shipping assistant component 275 at call center system 130. Shipping assistant component 275 may display the domestic rate in a postage rate field 750 as shown in FIG. 9.

Optionally, operator 120 may click a display restrictions button 740 to display restrictions on domestic shipping. For example, the restrictions are shown in FIG. 9 in a restrictions list 760.

Figure 10:
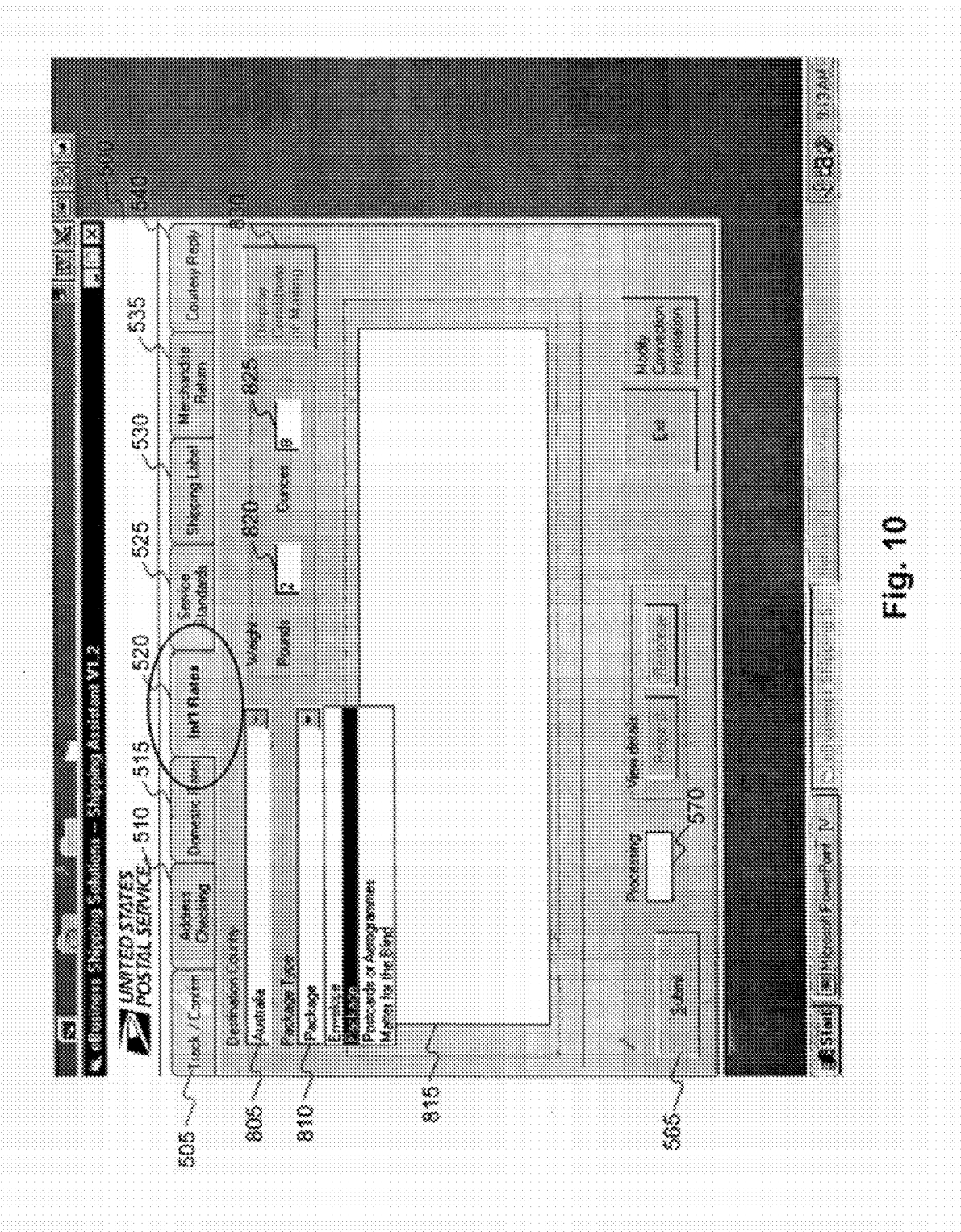

FIG. 10 is a diagram of a user interface for accessing international rates information. An operator 120 may receive a telephone call from a customer 100 for a purchase that is to be mailed to a recipient at an international location. Operator 120 may use information provided by customer 100 to request an international rate for shipping the merchandise to the recipient. As shown in FIG. 10, operator 120 may access an international rates user interface 500 by clicking tab 520. Operator 120 inputs information relevant to shipping the packaged merchandise, such as a destination country 805, and a package type 810. The package type 810 specifies the type of package to be shipped. The package type may include, for example, an envelope, package, postcard, etc. In addition, operator 120 may input the weight of the packaged merchandise in pounds 820 and ounces 825. Operator 120 may then click a submit button 565.

Thereafter shipping assistant component 275 generates a XML request for the international rate information and sends the XML request to Web Tools API server 140 through network 110. Tools API server 140 retrieves the requested information and sends it in a XML response to shipping assistant component 275 at call center system 130. Shipping assistant component 275 may display the international rate in a service response field 815.

Figure 11:
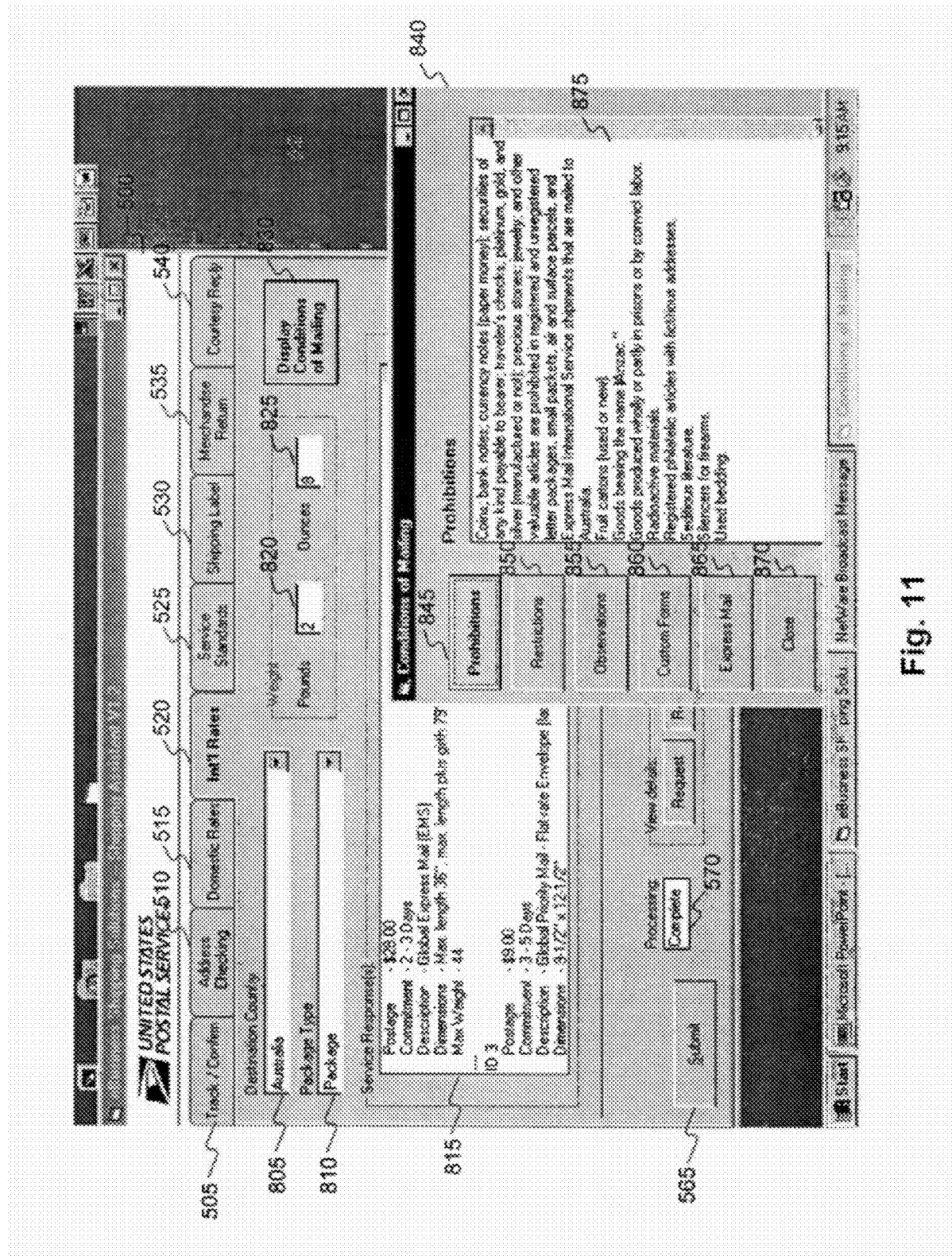

Optionally, operator 120 may click a display conditions of mailing button 830 to display conditions on mailing the packaged merchandise. For example, the user interface for the conditions on mailing 840 is shown in FIG. 11. As shown in FIG. 11, the operator 120 may click a prohibitions button 845, which displays the prohibitions in a list field 875. Alternatively, operator 120 may click a restrictions button 850, which displays the restrictions in the list field 875.

Figure 12:
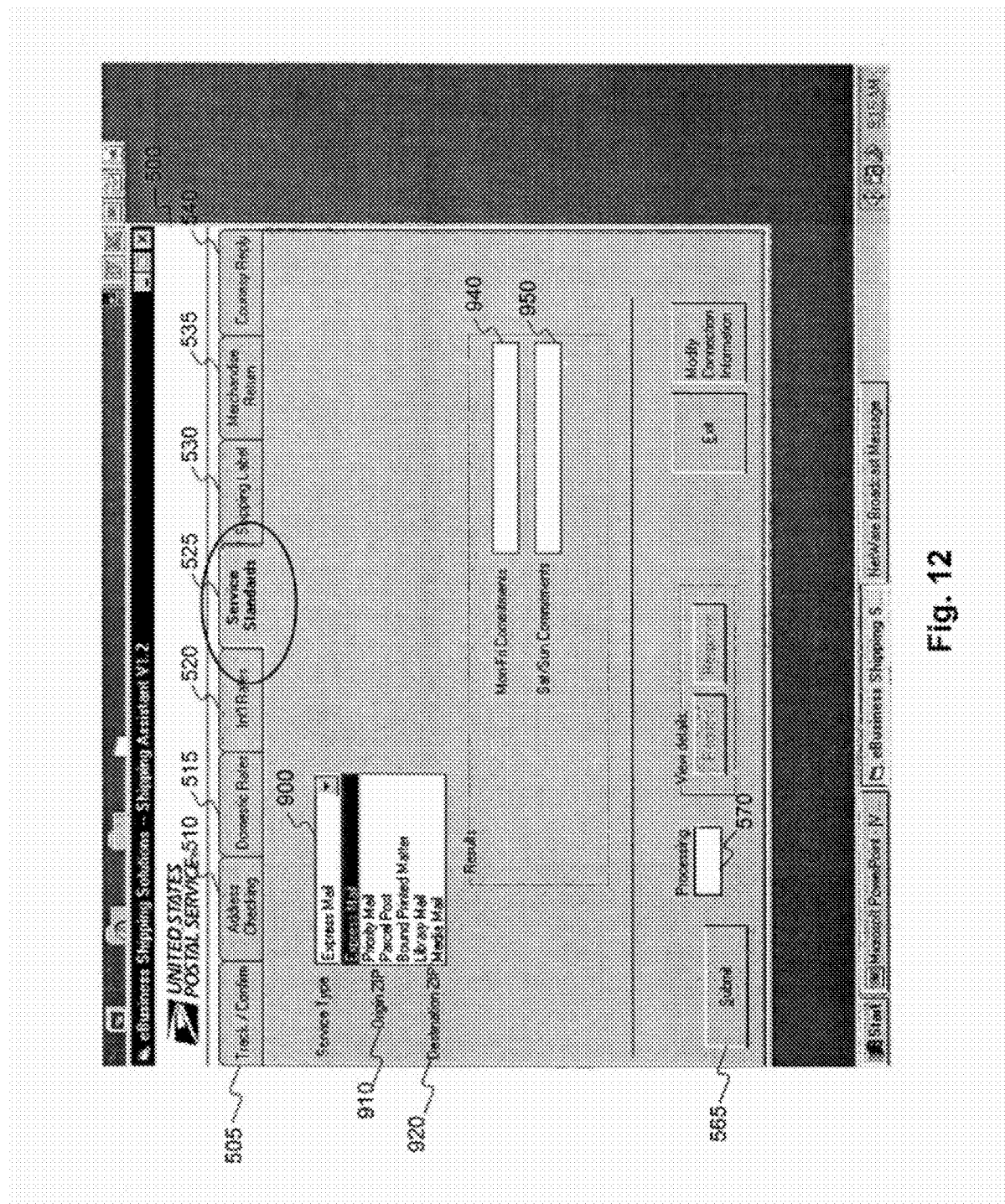

FIG. 12 is a diagram of a user interface for accessing service standards information. An operator 120 may receive a telephone call from a customer 100 for merchandise that is to be mailed to a recipient via express mail. Customer 100 desires to know a time in which to expect delivery of the merchandise. Operator 120 may use information provided by customer 100 to request a service standard for shipping the merchandise to the recipient.

As shown in FIG. 12, operator 120 may access a service standards user interface 500 by clicking tab 525. Operator 120 may input information relevant to a commitment on the delivery of the merchandise, such as a shipping service type 900, which specifies the type of delivery service to use in shipping the packaged merchandise. In addition, operator 120 may input information about the ZIP code of the sender 910 and the recipient 920. Operator 120 may then click a submit button 565.

Figure 13:
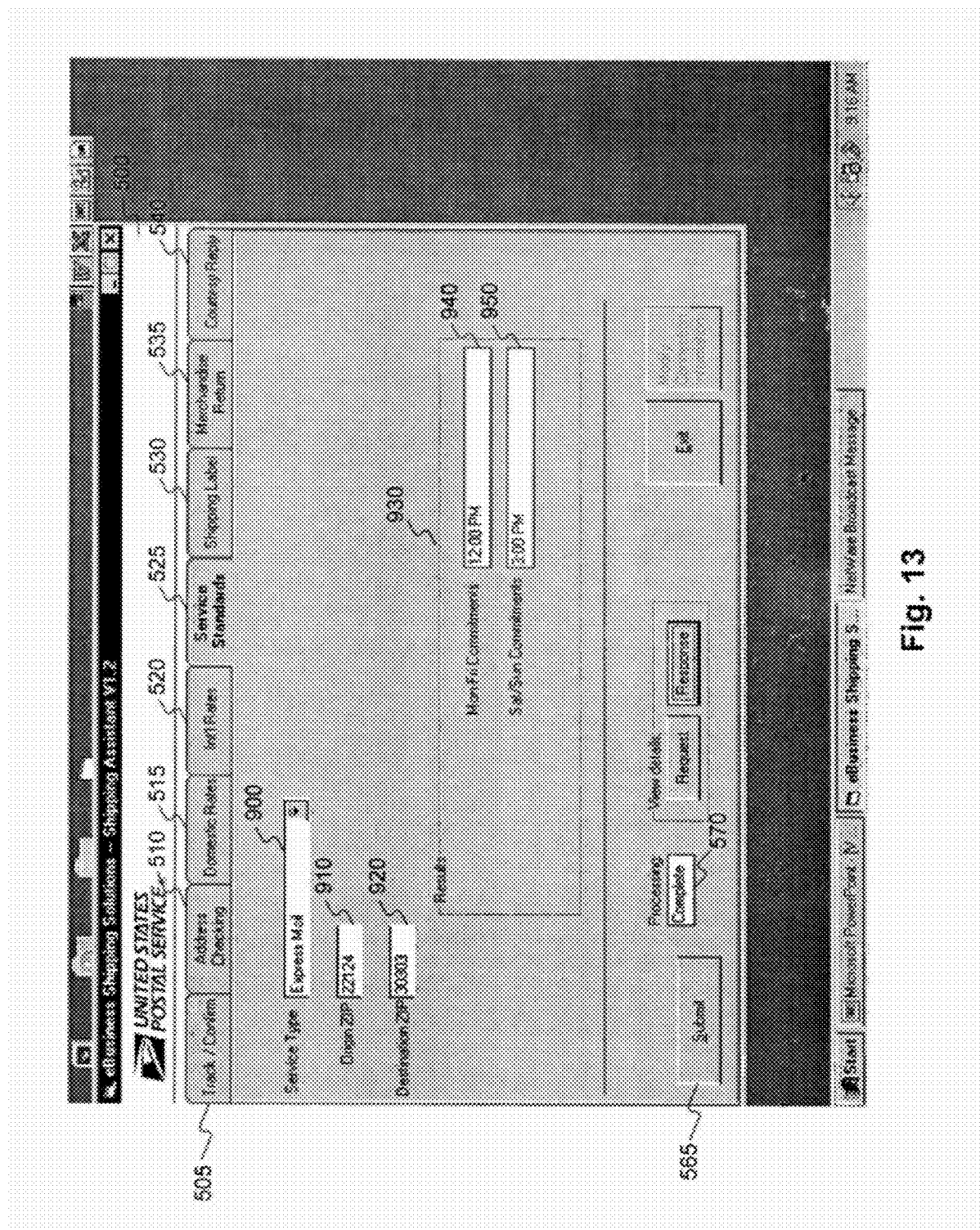

Thereafter, shipping assistant component 275 generates a XML request for the shipping standards information and sends the XML request to Web Tools API server 140 through network 110. Web Tools API server 140 retrieves the requested information and sends it in a XML response to the shipping assistant at the call center system 130. As shown in FIG. 13 shipping assistant component 275 may display the service standard for shipping during the weekday in field 940 and the standard for shipping during the weekend in field 950. Operator 120 may then provide the service standards to customer 100.

Figure 14:
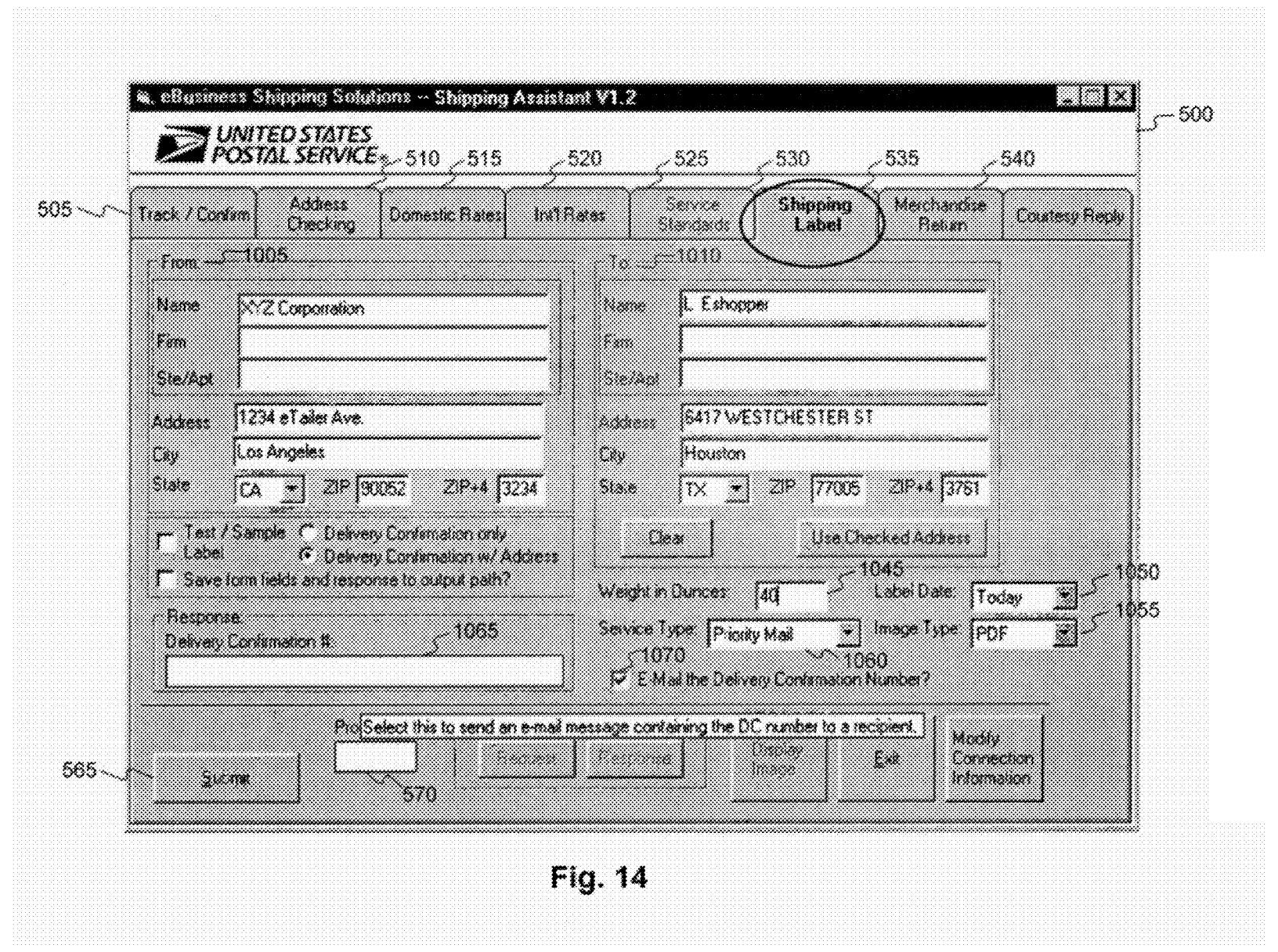

FIG. 14 is a diagram of a user interface for accessing shipping label information. An operator 120 may receive a telephone call from a customer 100 for a shipping label, which is to be attached to a package containing merchandise that is to be mailed to a recipient. Operator 120 may access a shipping label user interface 500 by clicking tab 530 to request a shipping label, for example, a delivery confirmation label. Operator 120 receives information from the customer 100 about the sender and/or recipient of the merchandise, shipping service type, and information about the package, such as the weight of the packaged merchandise.

As shown in FIG. 14, operator 120 inputs information about the sender in the from fields 1005 and information about the recipient in the to fields 1010. In addition, operator 120 supplies the weight of the package 1045, and a service type 1060. Operator 120 may select an image type 1055, label date 1050, and check an e-mail field 1070, which indicates whether to e-mail a delivery confirmation number to the sender and recipient of the merchandise. The delivery confirmation number provides for tracking the merchandise in a mail stream. Operator 120 may then click a submit button 565. Thereafter shipping assistant component 275 generates a XML request for the delivery confirmation label and sends the XML request to Web Tools API server 140 through network 110.

Web Tools API server 140 retrieves the requested information, generates the requested delivery confirmation label with a corresponding delivery confirmation number, and sends the delivery confirmation label and delivery confirmation number in a XML response to shipping assistant component 275 at call center system 130.

Shipping assistant component 275 may display the delivery confirmation number in the response field 1065 and provide the delivery confirmation label to operator 120. Then, operator 120 may provide the delivery confirmation label and delivery confirmation number to customer 100. The delivery confirmation label may be provided to customer 100 using any known delivery method. For example, the delivery confirmation label may be faxed to customer 100, e-mailed to customer 100, or printed at the telephone call center and mailed to customer 100. Alternatively, the delivery confirmation label may be sent to an e-commerce entity at an e-commerce server 150 for shipping the merchandise to the recipient. The delivery confirmation label may be attached to a package, along with any required postage, if any, and the package may be placed into the mail stream for delivery to the recipient specified on the delivery confirmation label.

Figure 15:
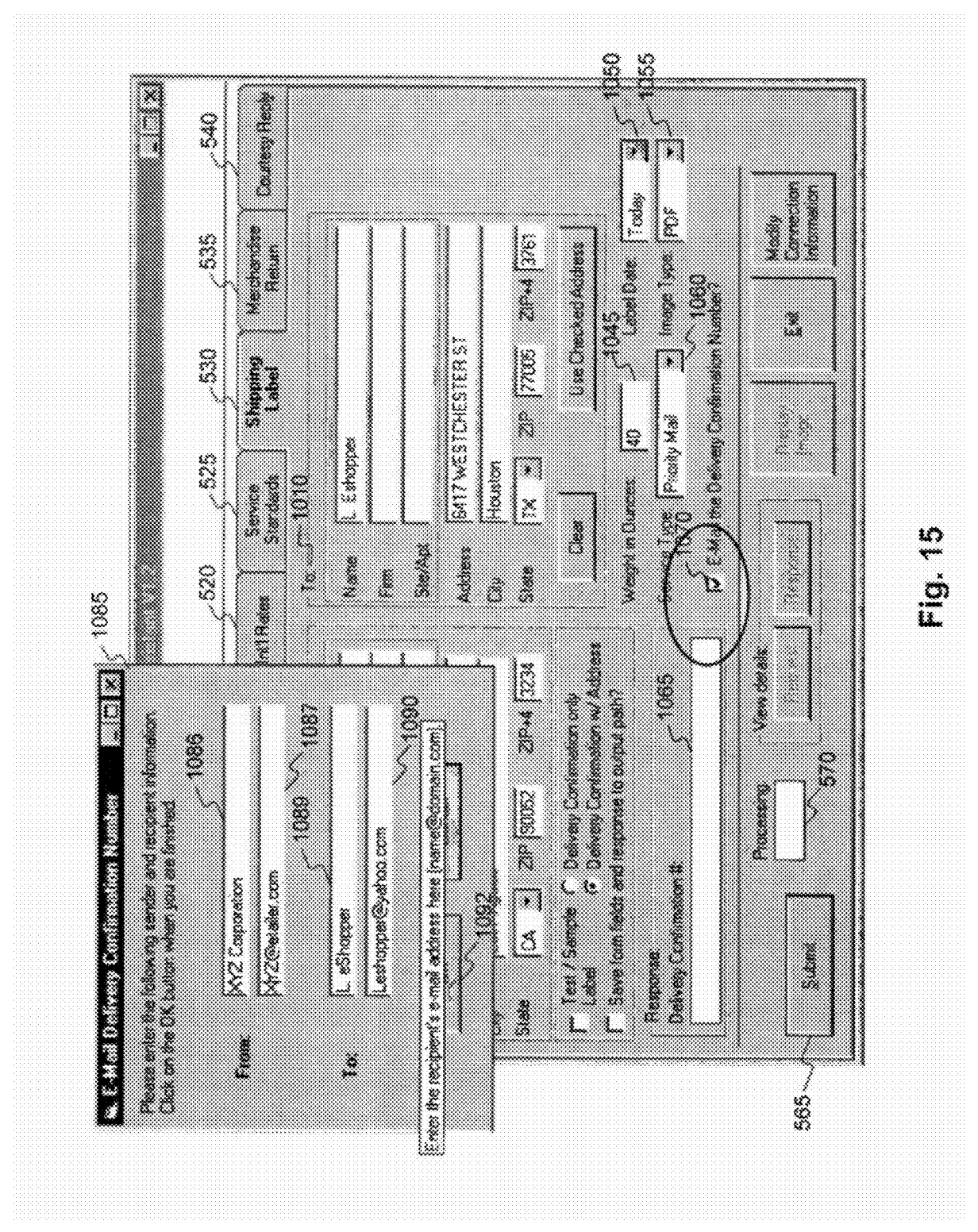

If operator 120 checked the e-mail field 1070, the user interface for e-mail delivery confirmation number shown in FIG. 15 may be displayed to operator 120. Operator 120 may enter the name 1086 and e-mail address 1087 of the sender and name 1089 and e-mail address 1090 of the recipient and click an "OK" button 1092 to submit the information to shipping assistant component 275. Thereafter, shipping assistant component 275 sends an e-mail notification to the sender and recipient of the merchandise notifying both of the delivery confirmation number. The delivery confirmation number may be used to track the delivery status of the merchandise.

Figure 16:
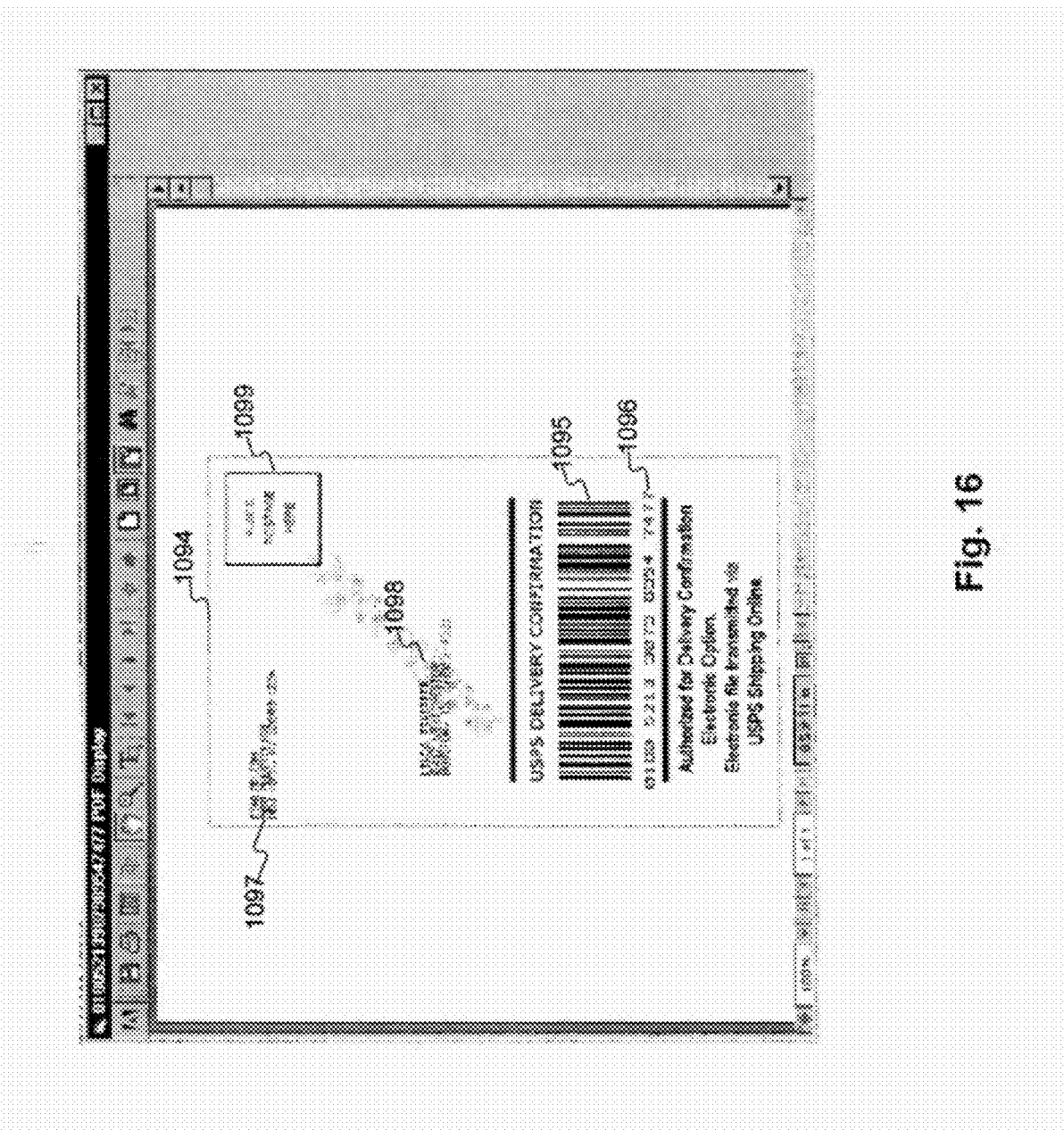

One example of a delivery confirmation label is shown in FIG. 16. As shown in FIG. 16, a delivery confirmation label 1094 may include a delivery confirmation bar code 1095, a delivery confirmation number 1096, the name and address of a sender 1097, and the name and address of a recipient 1098. The delivery confirmation label 1094 may include a location for the placement of postage 1099 or optionally, an indication of pre-paid postage.

The delivery confirmation barcode allows a sender and a recipient of a Priority Mail® or a Package Services mail item to obtain delivery confirmation information about the package's delivery based on the delivery confirmation number. As the package travels through a mail stream such as that provided by the USPS, the delivery confirmation barcode is scanned and the scanned information is stored in one or more tracking databases. Upon delivery of the package, the delivery confirmation barcode is scanned again, and the scanned information is stored in one or more tracking databases.

Figure 17:
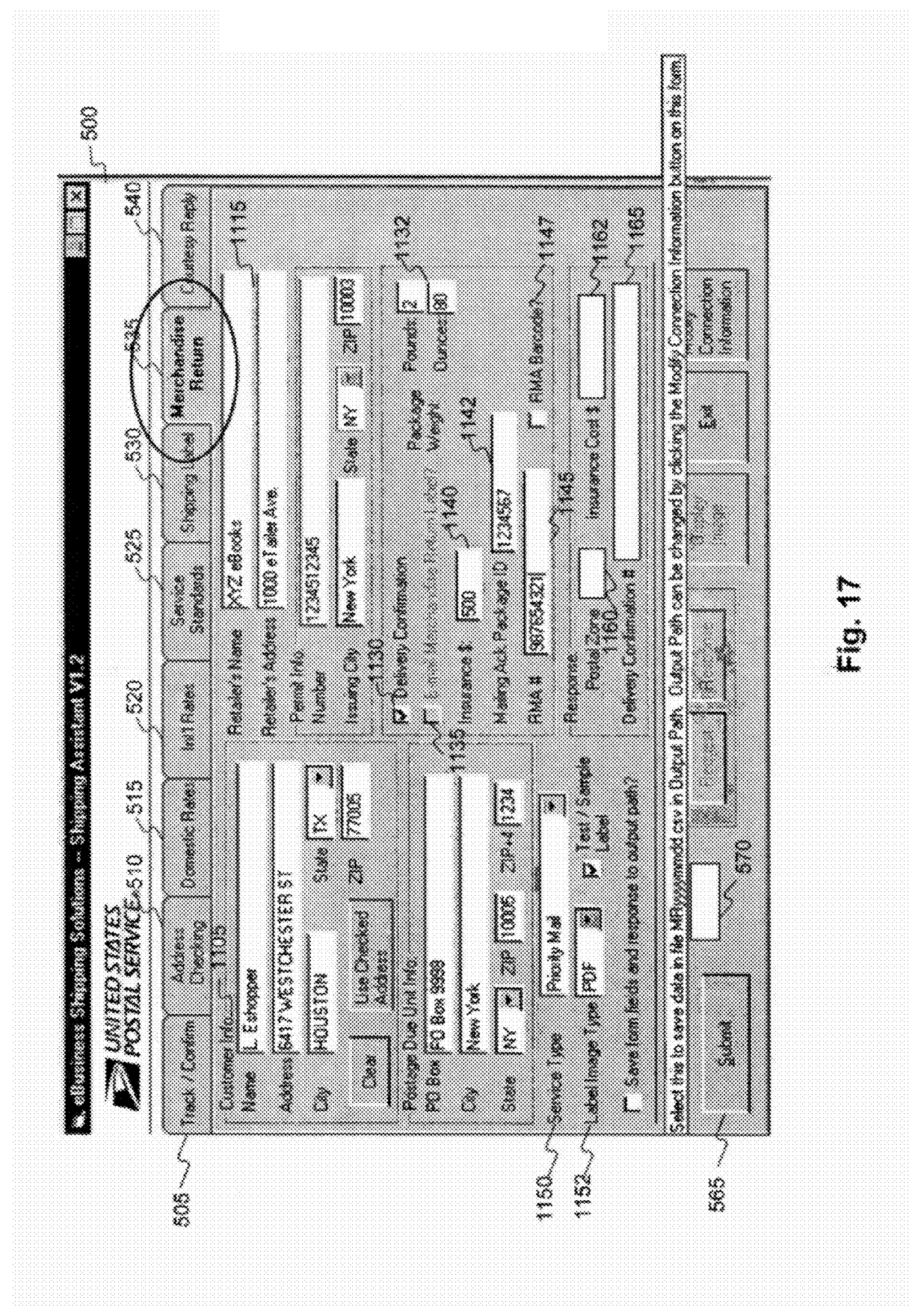

FIG. 17 is a diagram of a user interface for accessing merchandise return information. The merchandise return user interface 500 may be used to request a merchandise return label from Web Tools API server 140. The merchandise return label may be attached to a package, and the package may be placed into the mail stream for return of merchandise to the recipient specified on the merchandise return label. For purpose of this example, the recipient is a retailer and may include an e-commerce entity at an e-commerce server 150. An operator 120 may receive a telephone call from a customer 100 for a merchandise return label to return merchandise to a recipient. Operator 120 may access a merchandise return user interface 500 by clicking tab 535, to request a merchandise return label for returning the merchandise to the recipient.

Operator 120 receives information from the customer 100 and enters it into the fields of the user interface 500. The information may include, for example, information about the sender 1105 and the recipient 1115, shipping service type 1150, and information about the package, such as the weight of the packaged merchandise 1132 and a return authorization number 1145. The return authorization number may include, for example, a return materials authorization ("RMA"). In addition, the information may include a mailing acknowledgement identification number 1142. The RMA and mailing acknowledgement identification number are described in detail in the aforementioned U.S. Provisional Application Ser. No. 60/227,903 and copending U.S. patent application Ser. No. 10/344,992. Further, operator 120 may click a delivery confirmation checkbox 1130 to include a delivery confirmation barcode in the merchandise return label, and may click an e-mail merchandise return label checkbox 1135 to specify whether the merchandise return label is to be emailed to the sender.

Figure 19:
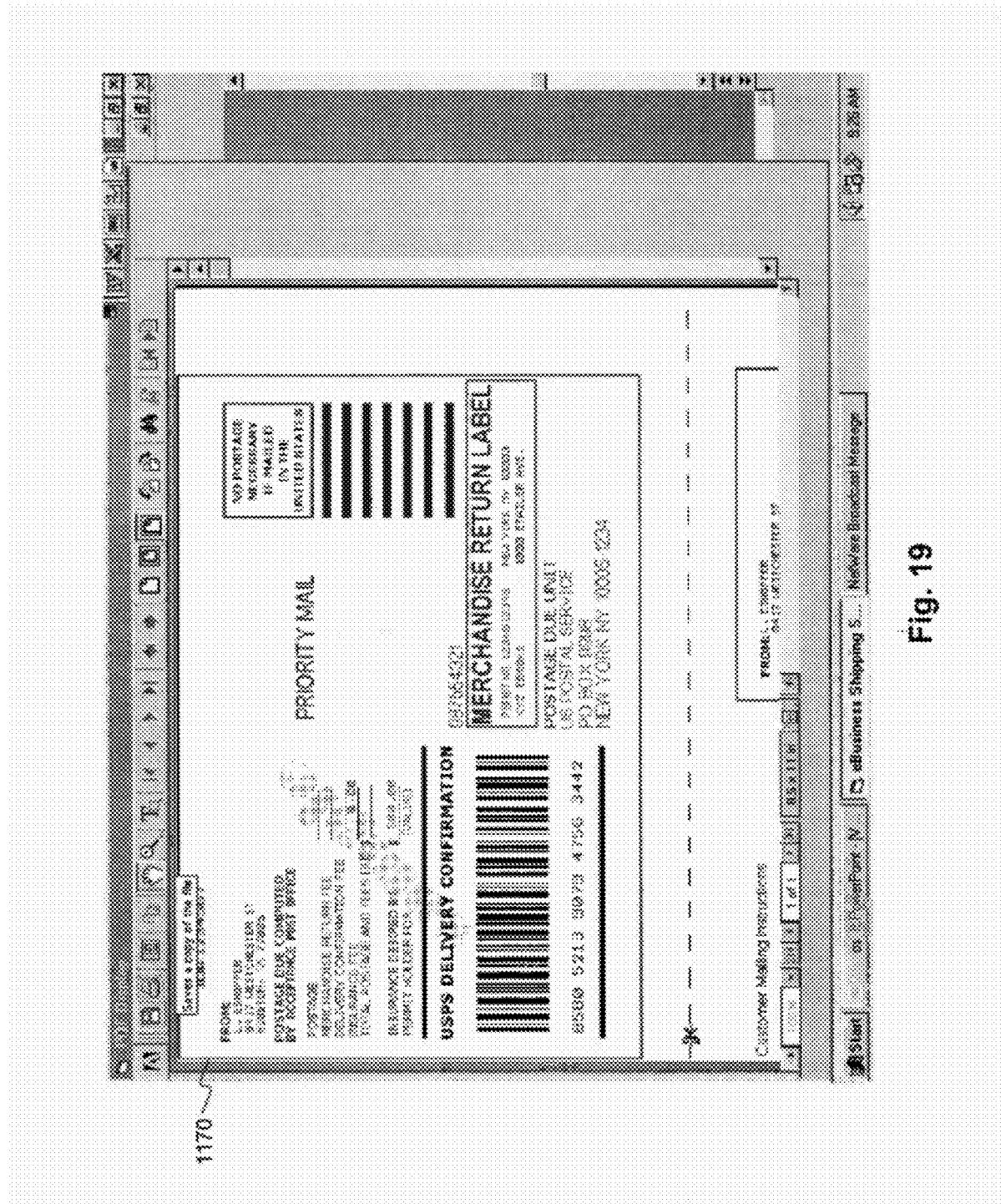

Operator 120 may then click a submit button 565. Thereafter shipping assistant component 275 generates a XML request for the merchandise return label and sends the XML request to Web Tools API server 140 through network 110. Web Tools API server 140 retrieves the requested information, generates the requested merchandise return label and sends the merchandise return label in a. XML response to shipping assistant component 275 at call center system 130. Shipping assistant component 275 may display a delivery confirmation number in the response field 1165 and information regarding the cost of insurance 1162 for the merchandise. In addition, shipping assistant component 275 may display the shipping label to operator 120 as shown in FIG. 19. Operator 120 may send the merchandise return label 1170 to customer 100 using any known delivery method. For example, the merchandise return label may be faxed to customer 100, e-mailed to customer 100, or printed at the telephone call center and mailed to customer 100. The merchandise return label may then be applied to a package containing the merchandise. The package may then be placed into the mail stream for delivery to the recipient. The merchandise return label 1170 is described in detail in the aforementioned U.S. Provisional Application Ser. No. 60/227,903 and copending U.S. patent application Ser. No. 10/344,992.

Figure 18:
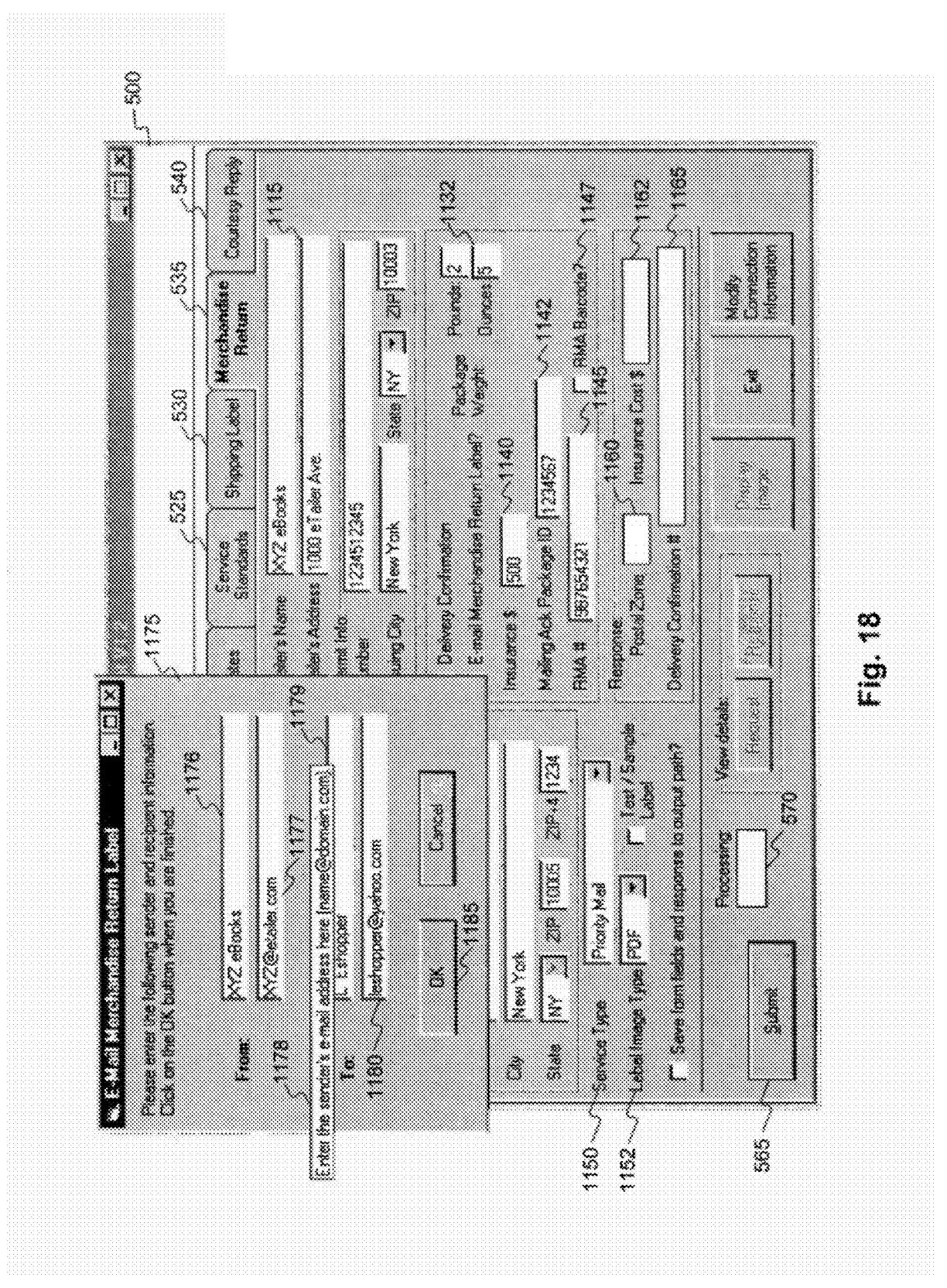

If operator 120 checked the e-mail merchandise return label checkbox 1135, the e-mail merchandise return label user interface 500 shown in FIG. 18 may be displayed to operator 120. Operator 120 may enter the name 1176 and e-mail address 1177 of the sender and name 1179 and e-mail address 1180 of the retailer, and click an "OK" button 1185 to submit the information to shipping assistant component 275. Shipping assistant component 275 sends the merchandise return label to the sender via e-mail and sends an e-mail notification to the retailer of the merchandise notifying the retailer that a merchandise return label was sent to the sender.

Figure 20:
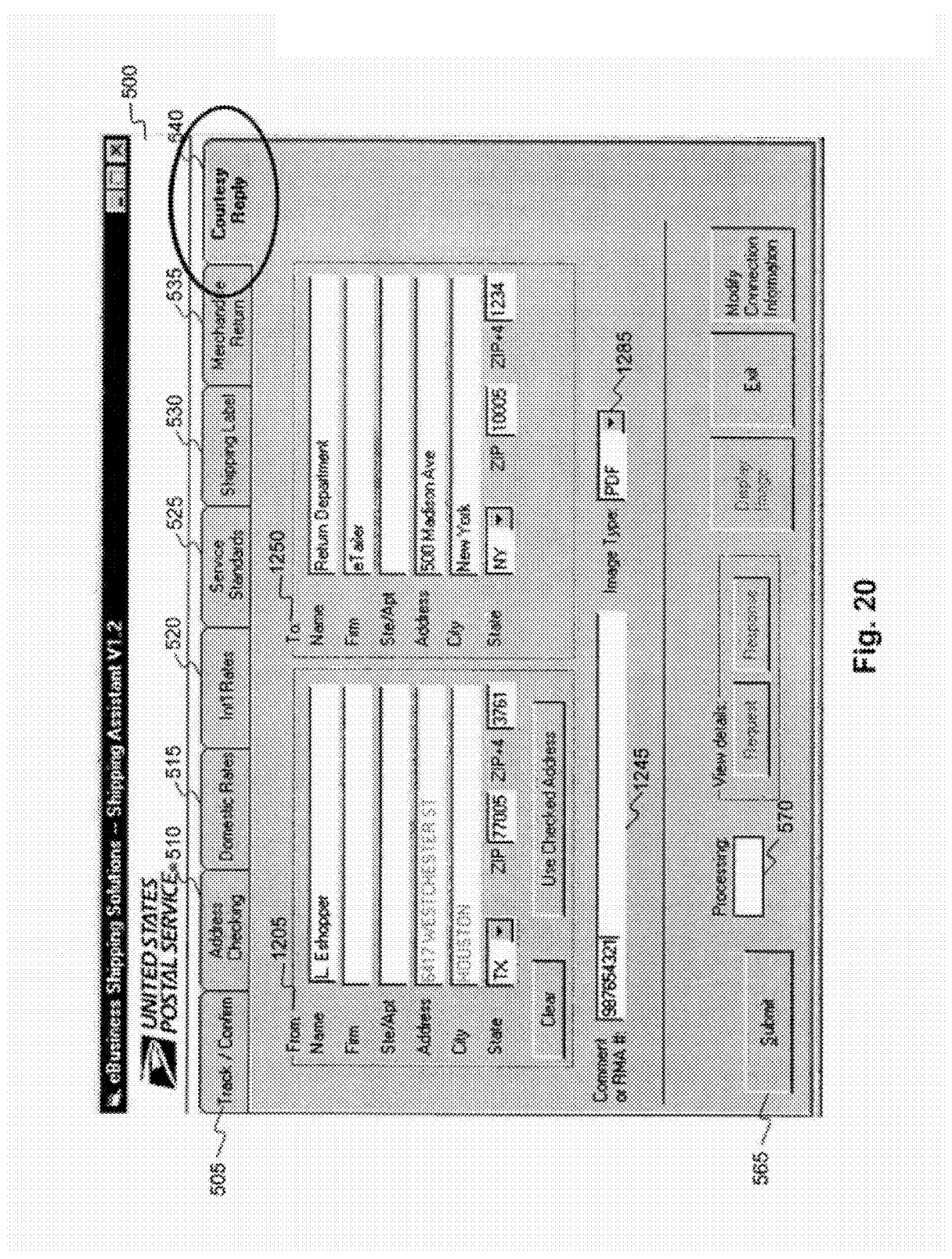

FIG. 20 is a diagram of a user interface for accessing courtesy reply information. The courtesy reply user interface 500 may be used to request a courtesy reply label from Web Tools API server 140. The courtesy reply label may be attached to a package, postage may be applied to the package, and the package may be placed into the mail stream for return of the merchandise to the recipient specified on the courtesy reply label. For purpose of this example, the recipient is a retailer. The courtesy reply label is described in detail in the aforementioned U.S. Provisional Application Ser. No. 60/227,903 and copending U.S. patent application Ser. No. 10/344,992.

An operator 120 may receive a telephone request for a courtesy reply label from a customer 100 who desires to return merchandise to a retailer. As shown in FIG. 18, operator 120 may access a courtesy reply user interface 500 by clicking tab 540. Operator 120 inputs information about the sender in the from fields 1205 of the courtesy reply user interface 500 and information about the retailer in the to fields 1250. Operator 120 may select an image type 1285, and provide any customer comments or an RMA number 1245. Operator 120 may then click a submit button 565. Thereafter shipping assistant component 275 generates a XML request for the courtesy reply label and sends the XML request to Web Tools API server 140 through network 110. Web Tools API server 140 retrieves the requested information, generates the requested courtesy reply label, and sends the courtesy reply label in a XML response to shipping assistant component 275 at call center system 130. Shipping assistant component 275 may display the courtesy reply label to operator 120 as shown in FIG. 19. Operator 120 may provide the courtesy reply label to customer 100 using any known delivery method. For example, the courtesy reply label may be faxed to customer 100, e-mailed to customer 100, or printed at the telephone call center and mailed to customer 100.

Figure 21:
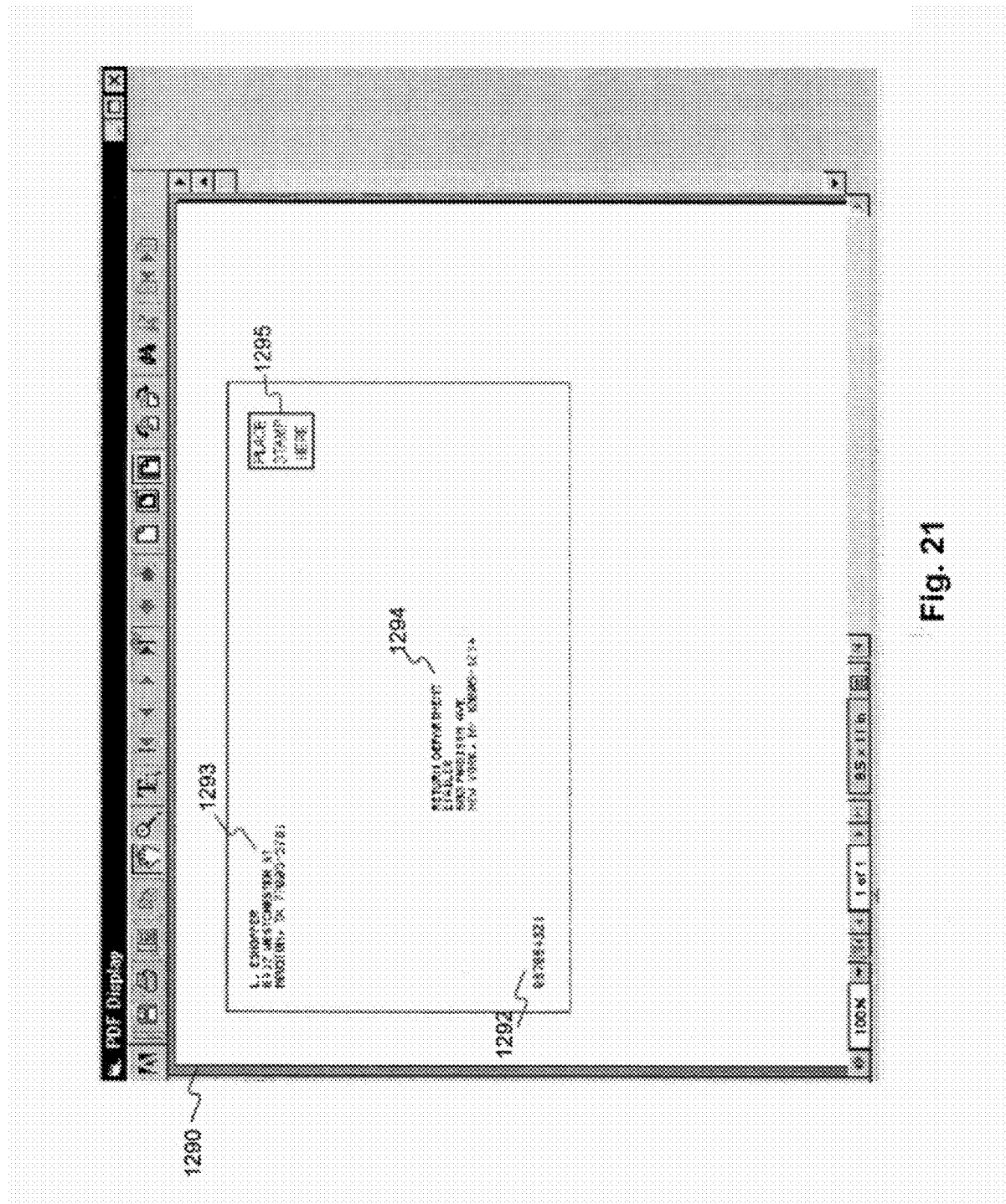

One example of a courtesy reply label is shown in FIG. 21. As shown in FIG. 21, a courtesy reply label 1290 may include an RMA number 1292, the name and address of a sender 1293, and the name and address of a retailer 1294. The courtesy reply label 1290 may include a location for the placement of postage 1295. The courtesy reply label 1290 may also include a delivery confirmation barcode.

Figure 22:
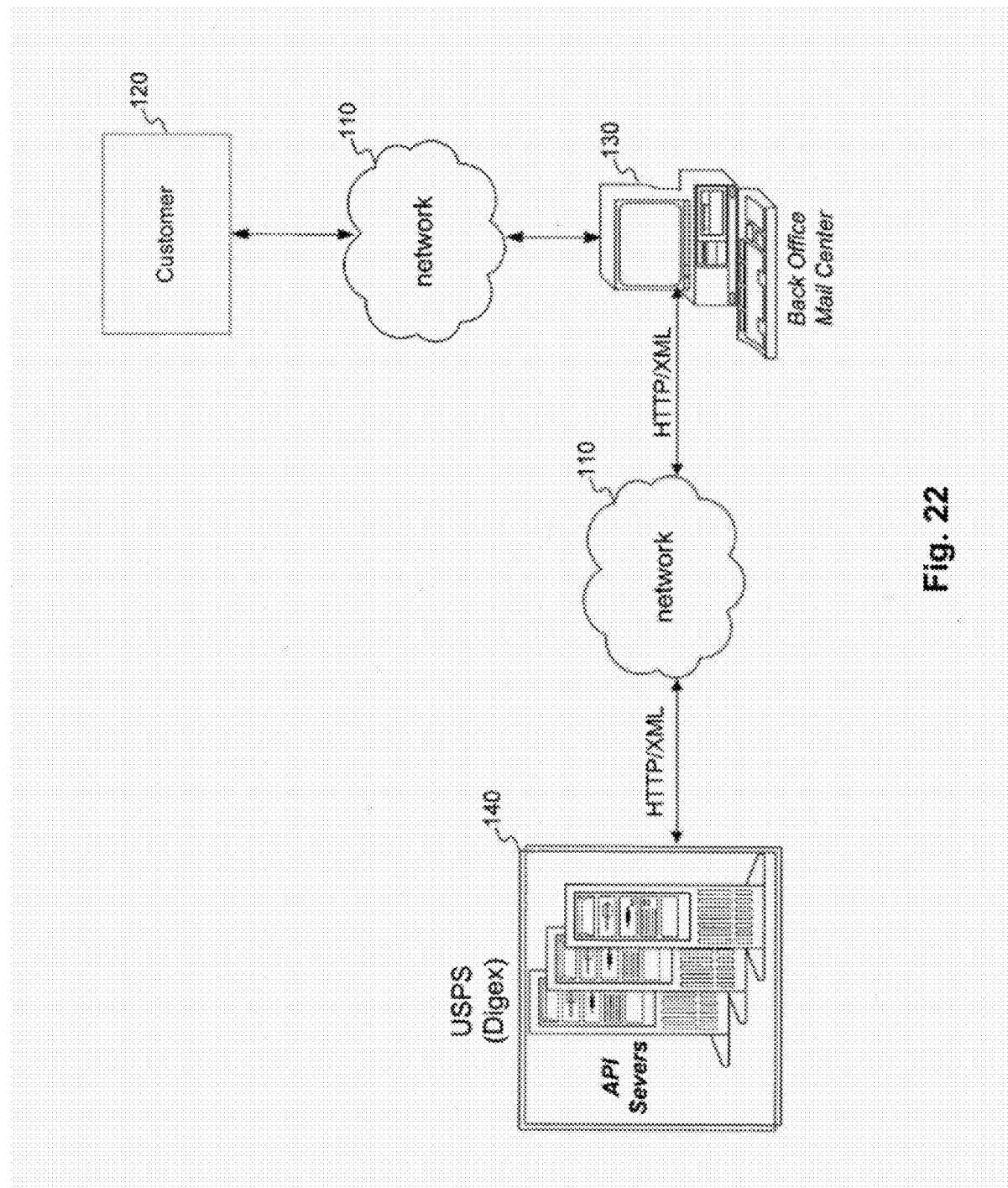
FIG. 22 is a schematic illustration of a system incorporating an embodiment of the invention through a back office mail center system.

FIG. 22 is a schematic illustration of a system incorporating an embodiment of the invention through a back office mail center system. In accordance with the present invention. As shown in FIG. 22, a back office mail center system 130 may be connected to one or more customer systems 120 and a Web Tools API server 140 through a network 110. Back office mail center system 130 is loaded with shipping assistant component 275 software supplied on an external storage medium, such as a compact disc ("CD"), floppy disk, etc.

Back office mail center system 130 is connected to Web Tools API server 140 via network 110, so that it may access shipping services information corresponding to the user interfaces shown in FIGS. 5-21, and described in detail above. Network 110 may include, for example, a Local Area Network (LAN), a Wide Area Network (WAN), a wireless network, the Internet, an intranet, and/or any other network or communication medium known to one of ordinary skill in the relevant art. Communications between back office mail center system 130, customer systems 120, and Web Tools API server 140, may take place over network 110 through a secure sockets layer ("SSL") protocol or secure HyperText Transfer Protocol ("S-HTTP"). Back office mail center system 130 includes the system configuration shown in FIG. 2, and described above in the description of FIG. 2.

Figure 23:
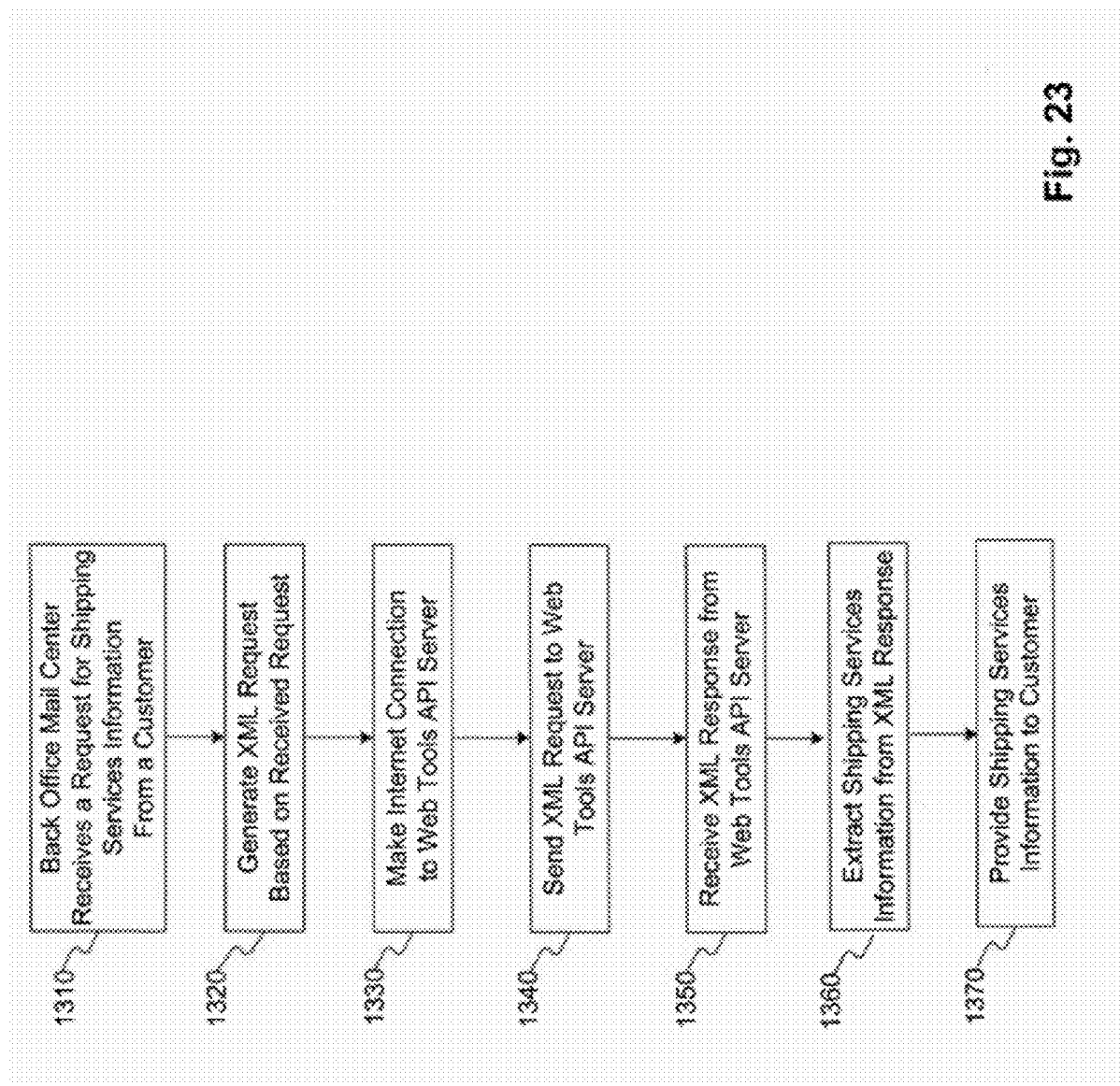
FIG. 23 is a flowchart showing a method for obtaining shipping services information over a network by a back office mail center system.

FIG. 23 is a flowchart showing a method for obtaining shipping services information over a network by a back office mail center system. A back office mail center system 130 receives a request from a customer 120 for shipping services information (stage 1310). Back office mail center system 130 calls a shipping assistant component 275 to process the request. Shipping assistant component 275 generates a XML request for the shipping services information (stage 1320). Shipping assistant component 275 may make a network connection to Web Tools API Server 140 (stage 1330). Next, shipping assistant component 275 sends the XML request to Web Tools API server 140 through network 110 (stage 1340). Web Tools API server 140 receives the XML request, generates a XML response to the request, and sends the XML response over the network to back office mail center system 130. The XML response includes the requested shipping services information.

Shipping assistant component 275 receives the XML response (stage 1350). Thereafter, shipping assistant component 275 extracts the shipping services information from the XML response (stage 1360). Thereafter, shipping assistant component 275 may provide the shipping services information to customer 120 by, for example, sending the shipping services information to customer 120 through network 110 (stage 1370). Alternatively, the shipping services information may be provided to customer 120 using any other known delivery method, such as fax, e-mail, physical (regular) mail, etc.

The shipping services information may be in the format, for example, of a label. The label may be printed on a printer and applied to a package. Thereafter, the package may be placed into a mail stream for delivery to the recipient specified in the label.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for obtaining shipping services information over a network by a call center receiving orders for merchandise, comprising:
   receiving order information related to the merchandise;
   generating an XML request for verified address information;
   sending the XML request to a server storing the verified address information;
   receiving an XML response including the verified address information; and
   providing a printable delivery confirmation label for shipment of the merchandise, the printable delivery confirmation label including the verified address information and a delivery confirmation number.

2. The method of claim 1 further comprising:
   providing the printable delivery confirmation label to a customer in an electronic message.

3. The method of claim 1 wherein the printable delivery confirmation label includes merchandise return information thereon.

4. The method of claim 3 wherein the merchandise return information includes at least one of addressing information, barcode information, and return authorization number.

5. The method of claim 3 wherein the merchandise return information includes an indication of pre-paid postage.

6. The method of claim 1 wherein the printable delivery confirmation label includes addressing information and barcode information.

7. The method of claim 1 wherein the printable delivery confirmation label includes at least one of addressing information, barcode information, and an indication of pre-paid postage.

8. The method of claim 1 wherein the call center is a retail telephone call center.

9. A system for obtaining shipping services information over a network by a call center receiving orders for merchandise, comprising:
   a receiving component configure to receive, at the call center, order information related to the merchandise;
   a generating component configured to generate an XML request for verified address information;
   a sending component configured to send the XML request to a server storing the verified address information;
   a receiving component configured to receive an XML response including verified address information; and
   a providing component configured to provide, over the network, to an operator at the call center, a printable delivery confirmation label for shipment of the merchandise, the printable delivery confirmation label including the verified address information and a delivery confirmation number.

10. The system of claim 9 wherein the providing component is further configured to provide the printable delivery confirmation label to a customer in an electronic message.

11. The system of claim 9 further comprising a printing component configured to print the shipping services information.

12. A non-transitory computer-readable medium configured to execute a method for obtaining shipping services information over a network by a call center receiving orders for merchandise:
   receiving order information related to the merchandise, the order information comprising a partial address information;

generating an XML request for verified address information based on the partial address information;

sending the XML request to a server storing the verified address information;

receiving an XML response including the verified address information; and transmitting, over the network, to an operator at the call center, a printable delivery confirmation label for shipment of the merchandise, the printable delivery confirmation label including the verified address information and a delivery confirmation number.

13. The method of claim 12 wherein the printable delivery confirmation label includes merchandise return information thereon.

14. The method of claim 13 wherein the merchandise return information includes at least one of addressing information, barcode information, and return authorization number.

15. The method of claim 13 wherein the merchandise return information includes an indication of pre-paid postage.

16. The method of claim 12 wherein the printable delivery confirmation label includes addressing information and barcode information.

17. The method of claim 12 wherein the printable delivery confirmation label includes at least one of addressing information, barcode information, and an indication of pre-paid postage.

18. The method of claim 12 wherein the call center is a retail telephone call center.

19. The method of claim 12, further comprising:

generating a request for the shipping services information for shipment of the merchandise, at least a portion of the requested shipping services information being related to the order information;

sending the request for the shipping services information to a second server over the network;

receiving the requested shipping services information from the second server over the network.

20. The method of claim 19, wherein, the printable delivery confirmation label includes the received shipping services information.

* * * * *